US011297254B2

(12) United States Patent
Kato et al.

(10) Patent No.: US 11,297,254 B2
(45) Date of Patent: Apr. 5, 2022

(54) IMAGE PROCESSING DEVICE, IMAGE PROCESSING METHOD, AND NON-TRANSITORY RECORDING MEDIUM

(71) Applicant: CASIO COMPUTER CO., LTD., Tokyo (JP)

(72) Inventors: Yoshiyuki Kato, Higashiyamato (JP); Tomohiko Murakami, Musashino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/016,459

(22) Filed: Sep. 10, 2020

(65) Prior Publication Data
US 2021/0092274 A1 Mar. 25, 2021

(30) Foreign Application Priority Data

Sep. 24, 2019 (JP) .............................. JP2019-173594
Mar. 25, 2020 (JP) .............................. JP2020-053725

(51) Int. Cl.
*H04N 5/235* (2006.01)
*H04N 5/232* (2006.01)

(52) U.S. Cl.
CPC ......... *H04N 5/2353* (2013.01); *H04N 5/2351* (2013.01); *H04N 5/23219* (2013.01)

(58) Field of Classification Search
CPC . H04N 5/2353; H04N 5/23219; H04N 5/2351
See application file for complete search history.

(56) References Cited

U.S. PATENT DOCUMENTS

| 2007/0177050 A1 | 8/2007 | Xiao et al. | |
| 2008/0024616 A1* | 1/2008 | Takahashi | H04N 5/353 348/221.1 |
| 2014/0267828 A1* | 9/2014 | Kasai | H04N 5/369 348/229.1 |

FOREIGN PATENT DOCUMENTS

| CN | 101013250 A | 8/2007 |
| JP | 2007201963 A | 8/2007 |

(Continued)

OTHER PUBLICATIONS

Japanese Office Action (and English language translation thereof) dated Jan. 4, 2022, issued in counterpart Japanese Application No. 2020-053725.

(Continued)

*Primary Examiner* — Ahmed A Berhan
(74) *Attorney, Agent, or Firm* — Holtz, Holtz & Volek PC

(57) ABSTRACT

An image processing device includes a memory storing a program, and at least one processor that executes the program. The processor sets an exposure condition for video imaging, acquires an image of the video imaged under the exposure condition, and calculates a brightness distribution from the image. The exposure condition includes a first exposure condition for causing the imaging device to capture an image using a first exposure value, and a second exposure condition causing the imaging device to capture an image using an exposure value higher than the first exposure condition and/or causing the imaging device to capture an image using a lower exposure value than the first exposure condition. The processor sets the first exposure condition or sets the first and the second exposure condition, based on the brightness distribution of the image captured under the first exposure condition after the first exposure condition is set.

16 Claims, 15 Drawing Sheets

(56) References Cited

FOREIGN PATENT DOCUMENTS

| JP | 2007251558 A | 9/2007 |
|----|--------------|--------|
| JP | 2010199962 A | 9/2010 |

OTHER PUBLICATIONS

Chinese Office Action (and English language translation thereof) dated Nov. 17, 2021, issued in counterpart Chinese Application No. 202010970792.0.

* cited by examiner

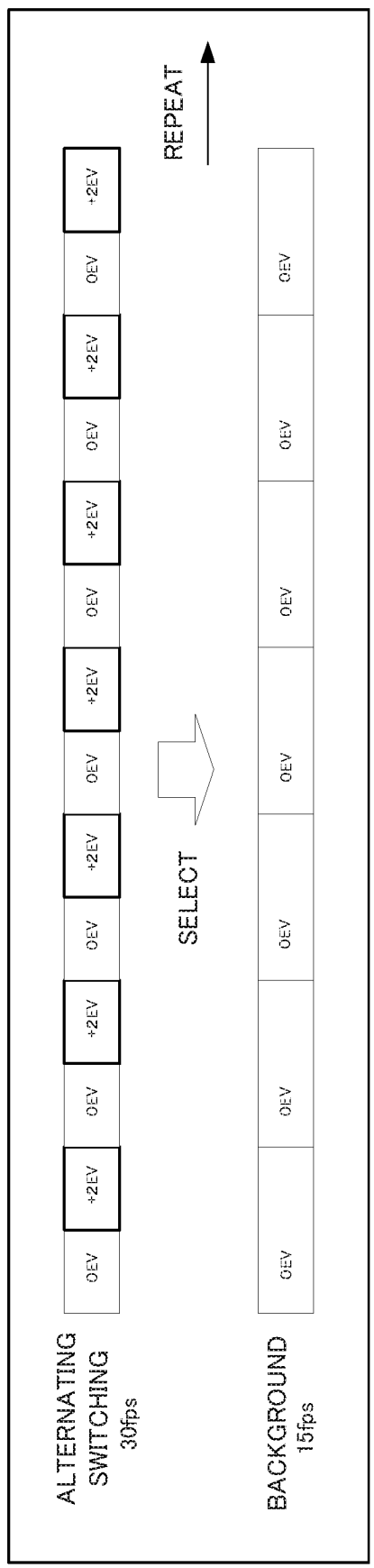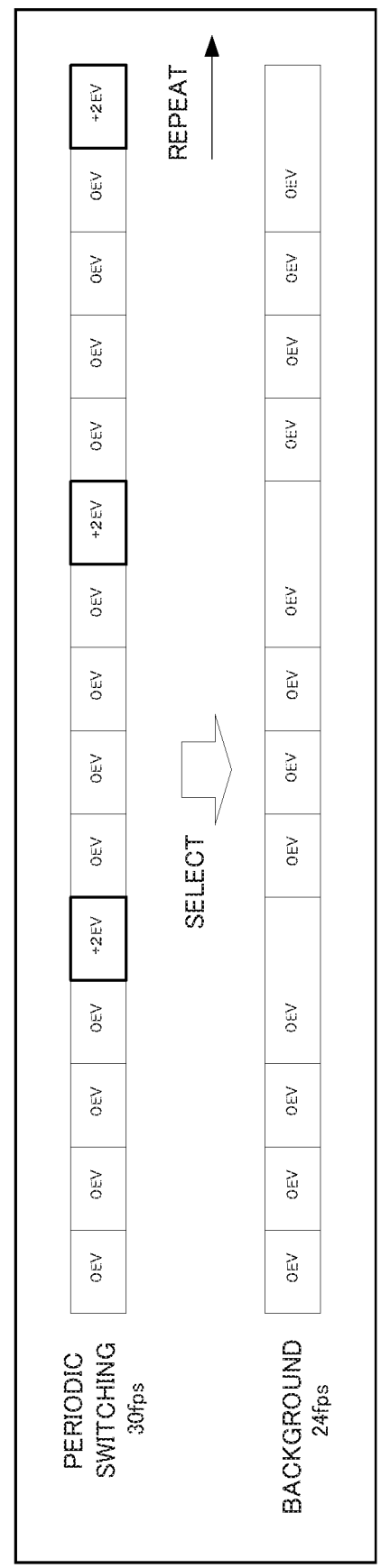

IMAGE PROCESSING DEVICE, IMAGE PROCESSING METHOD, AND NON-TRANSITORY RECORDING MEDIUM

CROSS-REFERENCE TO RELATED APPLICATION

This application claims the benefit of Japanese Patent Application No. 2019-173594, filed on Sep. 24, 2019, and Japanese Patent Application No. 2020-053725, filed on Mar. 25, 2020, the entire disclosure of which is incorporated by reference herein.

FIELD

The present disclosure relates to an image processing device, an image processing method, and a non-transitory recording medium.

BACKGROUND

There are techniques for detecting the face of a person from an image captured by an imaging device and performing facial recognition. Patent Literature 1 discloses a device that provides images suitable for face detection and facial recognition, even when there are brightness/darkness differences in the imaging area.

In the invention described in Japanese Unexamined Patent Application Publication No. 2007-251558, the exposure value of the imaging device is controlled so that the brightness distribution of an image, of a region of a detected face, is the same as the brightness distribution of a reference image serving as a basis for facial recognition.

SUMMARY

An image processing device of the present disclosure includes:
 a memory storing a program; and
 at least one processor executing the program stored in the memory, wherein the processor executing the program sets an exposure condition for imaging a monitoring video, acquires an image included in the monitoring video imaged under the set exposure condition, and calculates a brightness distribution from the acquired image, the exposure condition includes (1) a first exposure condition for causing an imaging device to capture the image using a first exposure value, and (2) a second exposure condition for at least one of causing the imaging device to capture the image using an exposure value higher than the first exposure value or causing the imaging device to capture the image using an exposure value lower than the first exposure value, and the processor sets the first exposure condition or set the first exposure condition and the second exposure condition as the exposure condition for imaging based on the brightness distribution of the image captured under the first exposure condition after the first exposure condition is set.

BRIEF DESCRIPTION OF THE DRAWINGS

A more complete understanding of this application can be obtained when the following detailed description is considered in conjunction with the following drawings, in which:

FIG. 15A illustrates switching of frames of an image processing device according to Embodiment 2 of the present disclosure, and illustrates a case of imaging under settings for switching frames every single frame;

FIG. 15B is a drawing of case of imaging four frames under a first exposure condition and, then, imaging one frame under a second exposure condition;

DETAILED DESCRIPTION

Hereinafter, an image processing device according to embodiments of the present disclosure is described in detail while referencing the drawings.

In one example, the image processing device according to the embodiments of the present disclosure generates image data for causing a facial recognition device of a facial recognition system to perform facial recognition at a railway train station in order to mine data related to the working start time and the working end time of railway users. This image data can also be used in office and event security, and the like. Note that the number of persons captured in an image is not particularly limited provided that the face images are not excessively small but, in the following description, for the sake of ease of description, the number of persons captured in an image is set to two.

Embodiment 1

Configuration of Facial Recognition System

Figure 1:
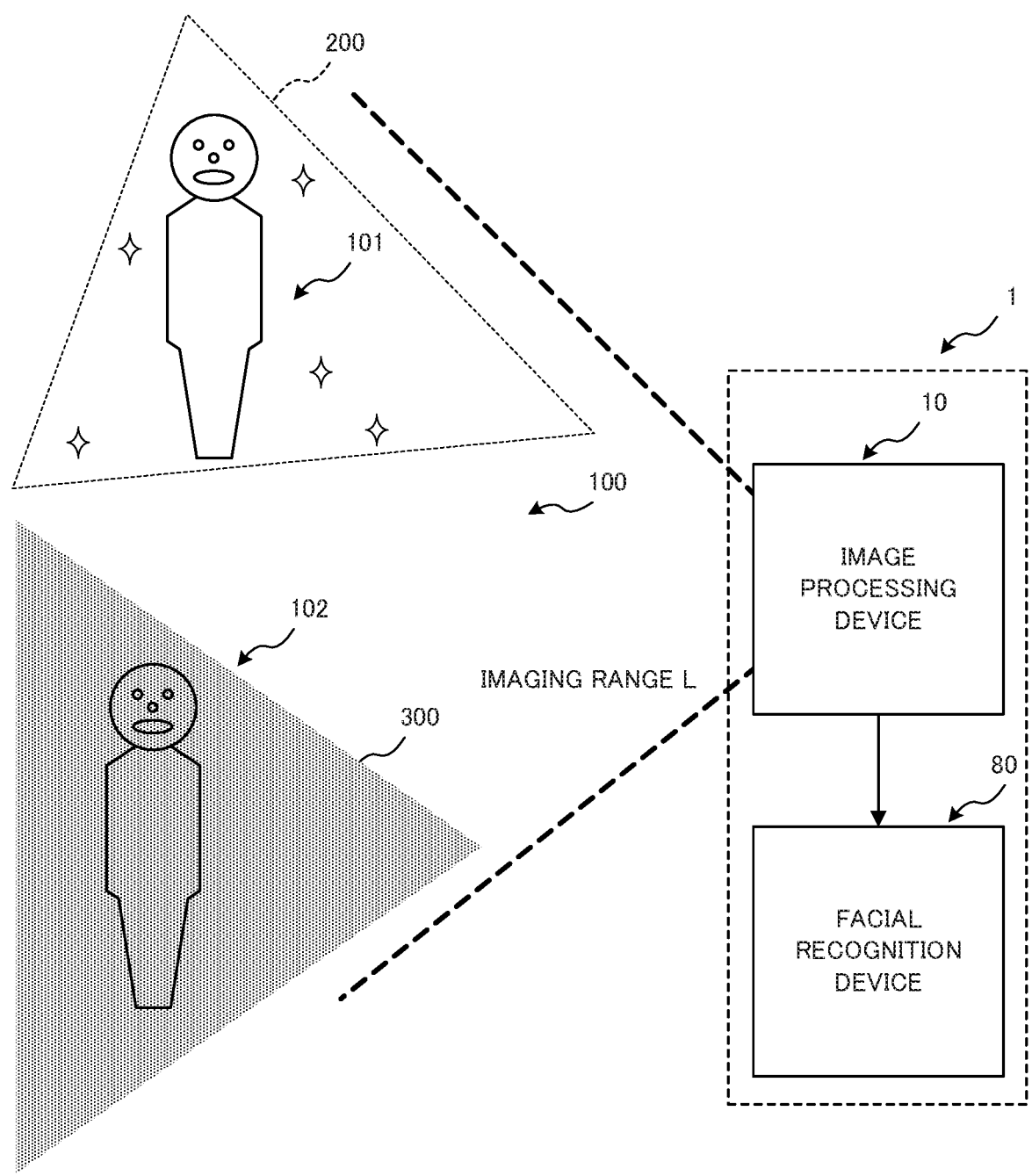
FIG. 1 is a drawing illustrating a facial recognition system according to Embodiment 1 of the present disclosure.

As illustrated in FIG. 1, a facial recognition system 1 includes an image processing device 10 and a facial recognition device 80. The image processing device 10 captures an image of a person 100 (101, 102), which is a recognition target area, present in an imaging range L of the facial recognition system 1, performs exposure correction processing 1 and image processing (described later), and sends image data suitable for facial recognition to the facial recognition device 80. A high brightness area 200, a low brightness area 300, and the like are produced in the imaging range L. The high brightness area 200 is an area in which sunlight enters from outside through a window, for example. The low brightness area 300 is an area in which shadows are produced by pillars or trains arriving at and departing from the train station. In some cases, facial recognition cannot be correctly performed on the persons 101, 102 that are in the high brightness area 200, the low brightness area 300, or the like in which the brightness/darkness difference is great. As such, the image processing device 10 performs exposure correction processing 1, image processing, and the like and provides image data suitable for facial recognition so that the facial recognition device 80 can perform facial recognition of the person 101 that is in the high brightness area 200 and of the person 102 that is in the low brightness area 300.

Figure 2:
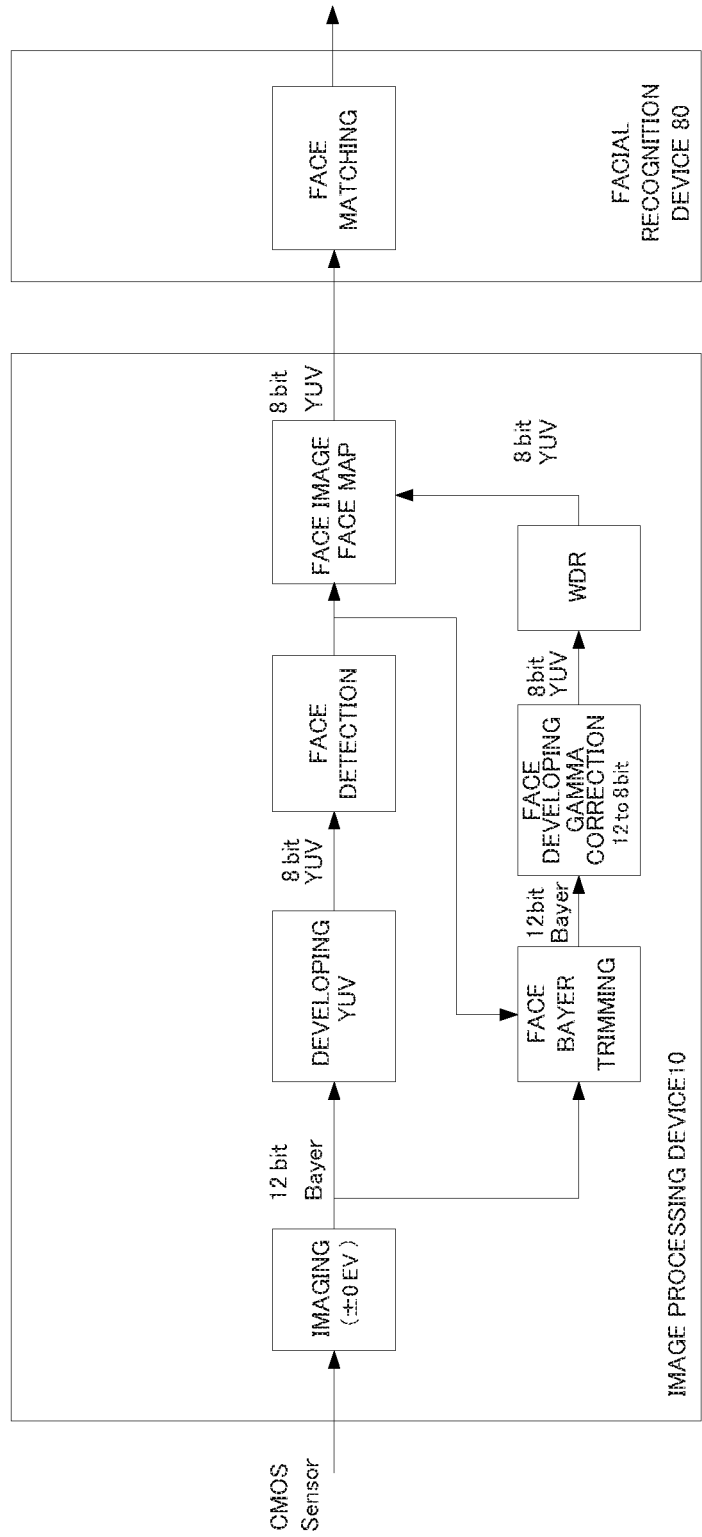
FIG. 2 is a drawing illustrating an overview of the processing flow of the facial recognition system according to Embodiment 1 of the present disclosure.

An overview of the processing performed by the facial recognition system 1 is described while referencing FIG. 2. The image captured by the imaging device is a 12-bit Bayer image, and this image is developed and tone corrected to generate a YUV image compressed to 8 bits. Face detection of the generated image is performed in the image processing device 10, and face matching is performed in the facial recognition device 80.

Configuration of Image Processing Device

Figure 3:
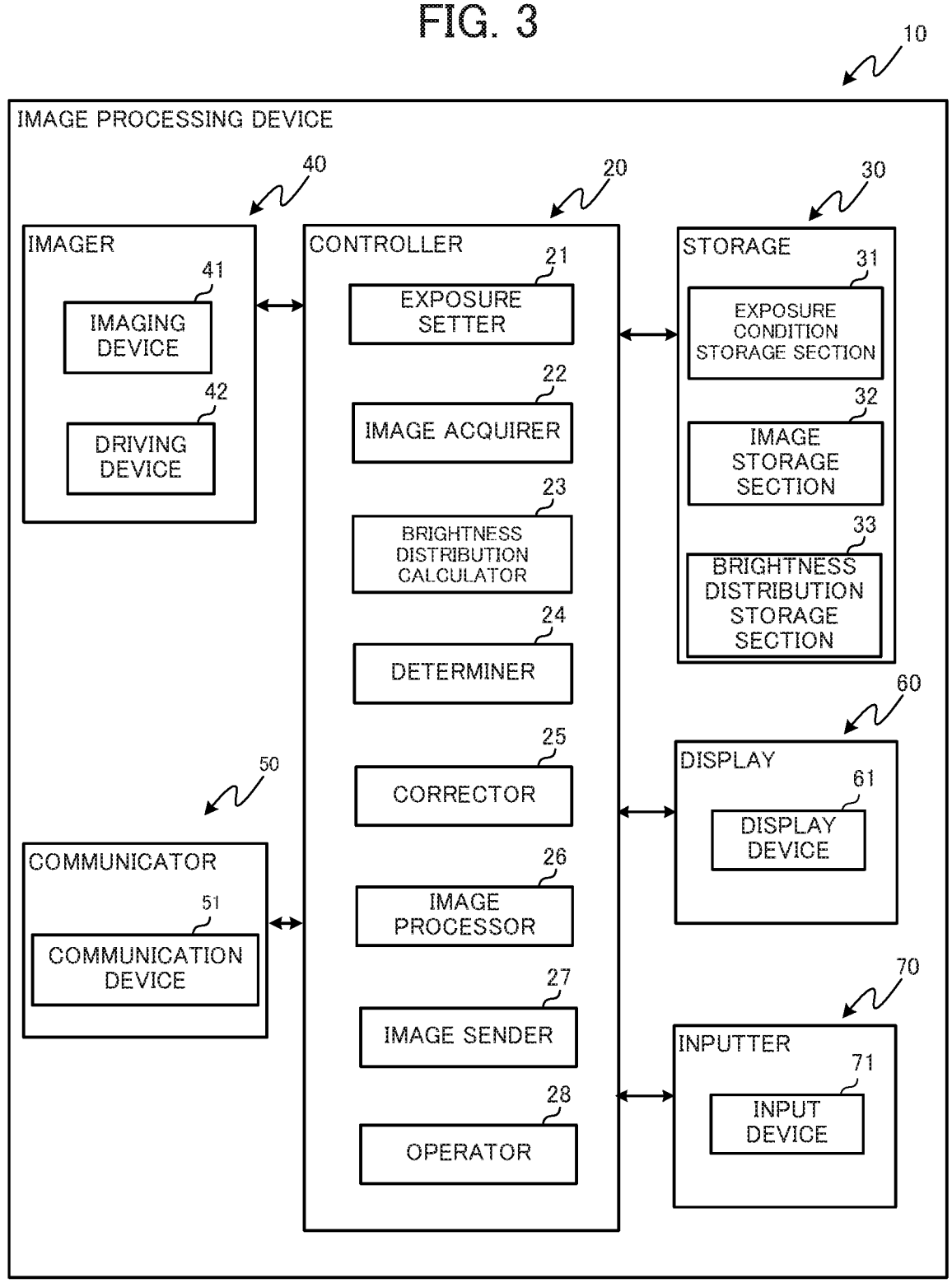
FIG. 3 is a block diagram of an image processing device according to Embodiment 1 of the present disclosure.

As illustrated in FIG. 3, the image processing device 10 includes a controller 20, a storage 30, an imager 40, a communicator 50, a display 60, and an inputter 70.

The controller 20 includes a central processing unit (CPU) or the like. The controller 20 executes a program or the like stored in the storage 30 to realize the functions of the hereinafter described components (an exposure setter 21, an image acquirer 22, a brightness distribution calculator 23, a determiner 24, a corrector 25, an image processor 26, an image sender 27, and an operator 28). Additionally, the controller 20 includes a clock (not illustrated in the drawings), and is capable of acquiring the current time and date, counting elapsed time, and the like.

The storage 30 includes a read-only memory (ROM), a random-access memory (RAM), or the like. The ROM is configured in part or in whole from electrically rewritable memory (flash memory or the like). The storage 30 functionally includes an exposure condition storage section 31, an image storage section 32, and a brightness distribution storage section 33. Programs to be executed by the CPU of the controller 20 and data needed in advance to execute these programs are stored in the ROM. Data that is created or modified during the execution of the programs is stored in the RAM.

An exposure condition set by the exposure setter 21 (described later) is stored in the exposure condition storage section 31. The exposure condition is set by the exposure setter 21, but can be corrected by the corrector 25, and can be changed and added by a user. Note that, typically, a first condition is set for the exposure condition and, at an initial setting, an exposure value EV0 of a typical state (exposure value at which a portion of 18% gray reflectance of the brightness/darkness of the subject is correctly imaged) is set.

An image V acquired by the image acquirer 22 is stored in the image storage section 32. Additionally, an image V1 processed by the image processor 26 is stored in the image storage section 32.

A brightness distribution B calculated by the brightness distribution calculator 23 is stored in the brightness distribution storage section 33.

The imager 40 includes an imaging device 41 and a driving device 42.

In the present embodiment, the imaging device 41 includes a Complementary Metal Oxide Semiconductor (CMOS) camera. The imaging device 41 captures the image V under the exposure condition set by the exposure setter 21. The image V is a Bayer image, and is output in 12-bit resolution.

The driving device 42 moves the position of the imaging device 41 in accordance with commands from the operator 28 (described later) to adjust the imaging range L.

The communicator 50 includes a communication device 51 that is a module that enables communication with the facial recognition device 80, external devices, and the like. The communication device 51 is a wireless module that, in cases in which communication with external devices is to be performed, includes an antenna. In one example, the communication device 51 is a wireless module for performing short-range wireless communication based on Bluetooth (registered trademark). By using the communicator 50, the image processing device 10 can exchange image data and the like with the facial recognition device 80 and the external devices.

The display 60 includes a display device 61 includes a liquid crystal display (LCD).

A thin film transistor (TFT), liquid crystal, organic EL, or the like can be used as the display device 61. The images V, V1, the brightness distribution B of the image V calculated by the brightness distribution calculator 23, and the like are displayed on the display device 61.

The inputter 70 is a resistive film touch panel that is provided in close proximity to the display 60 or integrated with the display 60. The touch panel may be an infrared operation-type or projected capacitive-type touch panel. Alternatively, the inputter 70 may be a keyboard, a mouse, or the like instead of a touch panel. The user can correct the brightness distribution B displayed on the display 60 by performing manual operations via the inputter 70.

Next, the functional configuration of the controller 20 of the image processing device 10 is described. The controller 20 realizes the functions of the exposure setter 21, the image acquirer 22, the brightness distribution calculator 23, the determiner 24, the corrector 25, the image processor 26, the image sender 27, and the operator 28, and performs exposure correction, exposure tracking, image synthesis, and the like.

The exposure setter 21 sets the exposure condition for when the imager 40 captures a monitoring video. The exposure condition is set based on a calculation result, calculated by the brightness distribution calculator 23 (described later), of a brightness distribution D of the image V. The set exposure condition is stored in the exposure condition storage section 31. Additionally, the exposure setter 21 sets a second condition when a peak P of the brightness distribution D calculated from the acquired image V is not in a predetermined range R (described later).

The image acquirer 22 causes the imager 40 to capture the monitoring video under the exposure condition set by the exposure setter 21, and acquires the image V included in the captured monitoring video. The image acquirer 22 stores the acquired image V in the image storage section 32.

The brightness distribution calculator 23 calculates the brightness distribution D (distribution of numerical values obtained by assigning brightnesses of 0% to 100% to 0 to 255) from the image V acquired by the image acquirer 22. The brightness distribution calculator 23 stores the calculated brightness distribution D of the image V in the brightness distribution storage section 33.

The determiner 24 determines if the peak P (P1, P2 ...) of the brightness distribution D calculated by the brightness distribution calculator 23 is in the predetermined range R, is less than the predetermined range R, or exceeds the predetermined range R. As illustrated in the brightness distribution diagrams of FIGS. 4A to 4C, in the present embodiment, the predetermined range R is a range of 63 to 191, which is the two middle regions (MID_1 and MID_2) of four regions obtained by dividing the brightness levels of 0 to 255 into four regions. If the peak P is in the MID_1 and MID_2 regions, the influences of whiteout and blackout on the image V are small even without adding a frame.

The corrector 25 performs correction so as to move the peak P to the center of the predetermined range R when the peak P of the brightness distribution D calculated by the brightness distribution calculator 23 is in the predetermined range R. The correction method is described later.

The image processor 26 processes the image V stored in the image storage section 32. A face image F2 in an image V2 of one exposure setting is combined with an image V1 of another exposure setting to generate images VA, VB on which the facial recognition device 80 can perform facial recognition.

The image sender 27 sends the acquired image V, the processed image V1, and the like to the facial recognition device 80.

The operator 28 sends, to the driving device 42, a command for moving the imaging range L of the imager 40.

The functional configuration of the controller 20 is described above. Next, details of the exposure correction performed by the image processing device 10 are described using, as examples, cases in which the brightness distribution acquired from the captured image is as illustrated in FIGS. 4A to 4C.

Figure 4A:
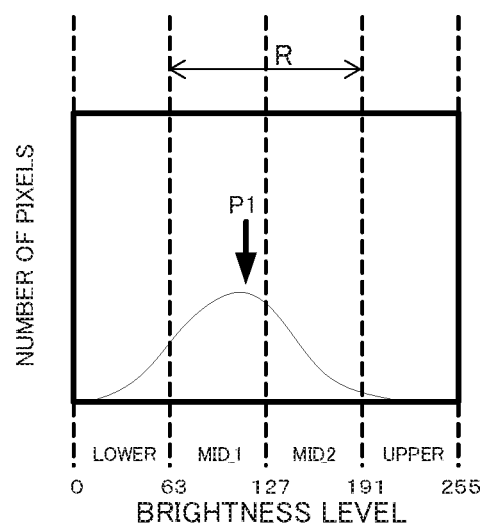
FIG. 4A is a drawing illustrating a brightness distribution of an image captured by the image processing device according to Embodiment 1 of the present disclosure, and illustrates the brightness distribution when imaging using a typical exposure value.
Figure 5A:
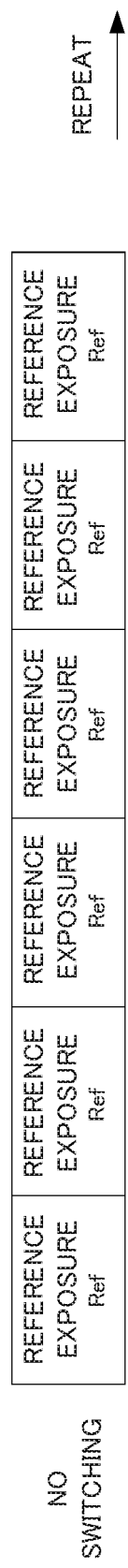
FIG. 5A illustrates the switching of the frames of the image processing device according to Embodiment 1 of the present disclosure, and is a drawing of a case of imaging under typical settings.

First, when the peak P of the brightness distribution D is in the predetermined range R (brightness level of 63 to 191) as illustrated in FIG. 4A, the corrector 25 calculates $$\Delta = 127/P \quad (1)$$

based on the peak P of the brightness distribution D. The corrector 25 multiplies A by the peak P, fine-adjusts the first condition so that the peak P is positioned at the center of the predetermined range R, and captures the image V1. In this case, as illustrated in FIG. 5A, only imaging of a frame of a reference exposure Ref, which is the first exposure condition, is performed, without an additional frame.

Figure 4B:
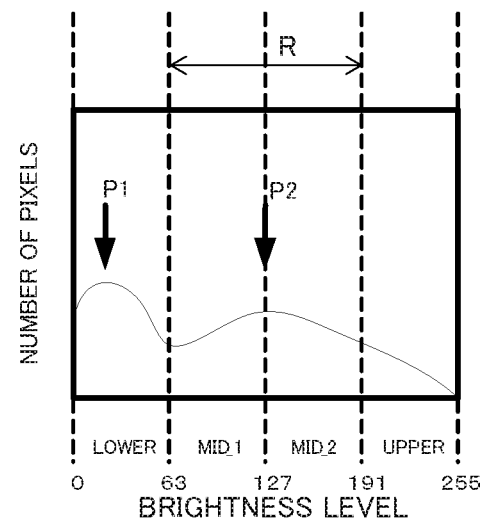
FIG. 4B is a drawing of a brightness distribution when imaging using a typical exposure value and a positive exposure value.
Figure 4C:
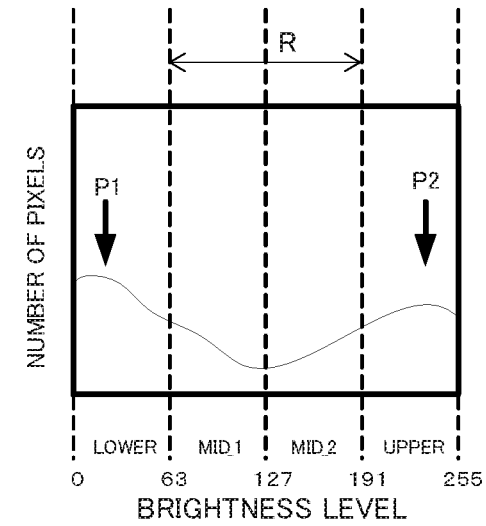
FIG. 4C is a drawing of a brightness distribution when imaging using a typical exposure value, a positive exposure value, and a negative exposure value.
Figure 5B:
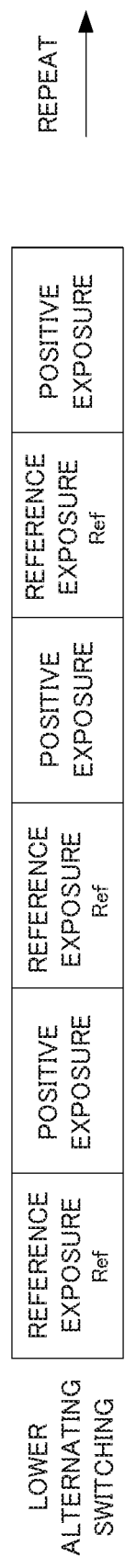
FIG. 5B is a drawing of a case of alternately imaging under exposure settings of typical and positive exposure values.

Next, when, as illustrated in FIG. 4B, the peak P1 of the brightness distribution D is less than the predetermined range R and the peak P2 is in the predetermined range R, the corrector 25 multiples the peak P1 by the $\Delta$ obtained in Equation (1) from the peak P1 of the brightness distribution D, and sets the second condition that has an increased exposure value so as to position the peak P1 at the center of a predetermined range RE As illustrated in FIG. 5B, the imaging device 41 performs imaging by alternately switching frames based on the exposure value of the first exposure condition (reference exposure Ref) and the exposure value of the second exposure condition (Positive exposure). Note that, when the peak P1 that is outside the predetermined range R exceeds the predetermined range R instead of being less than the predetermined range R, the second exposure condition is obtained by decreasing the exposure value using Equation (1). In this case, the second exposure condition is Negative exposure, and the Positive exposure frame of FIG. 5B is replaced with a Negative exposure frame. That is, frames of the reference exposure Ref and the Negative exposure are alternately imaged.

Figure 5C:
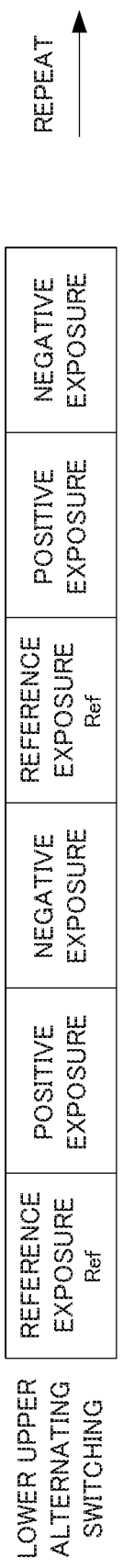
FIG. 5C is a drawing of a case of alternately imaging under exposure settings of a typical exposure value, a positive exposure value, and a negative exposure value.

When, as illustrated in FIG. 4C, the peak P1 of the brightness distribution D is less than the predetermined range R and the peak P2 exceeds the predetermined range R, the corrector 25 multiples the peak P1 by the $\Delta$ obtained in Equation (1) from the peak P1 of the brightness distribution D, and sets a second exposure condition that has an increased exposure value so as to position the peak P1 at the center of the predetermined range R1 and, also, multiples the peak P2 by the $\Delta$ obtained in Equation (1) from the peak P2 of the brightness distribution D, and sets a second exposure condition that has a decreased exposure value so as to position the peak P2 at the center of the predetermined range R1. As illustrated in FIG. 5C, the imaging device 41 performs imaging by sequentially switching between three frames based on the exposure value of the first exposure condition (the reference exposure Ref) and the exposure values of the two second exposure conditions (the Positive exposure and the Negative exposure).

Facial Recognition Device

In one example, the facial recognition device 80 is a device in which eigenfaces generated by principle component analysis are used as a facial recognition algorithm. The facial recognition device 80 performs facial recognition (two-dimensional facial recognition) using the image data sent from the image processing device 10.

Various processing performed by image processing device Next, the exposure correction processing 1, the exposure tracking processing, and the image synthesis processings 1 and 2 performed by the image processing device 10 are described using flowcharts. Note that the exposure correction processing 1, the exposure tracking processing, and the image synthesis processings 1 and 2 can be executed in parallel.

Exposure Correction Processing 1

Figure 6:
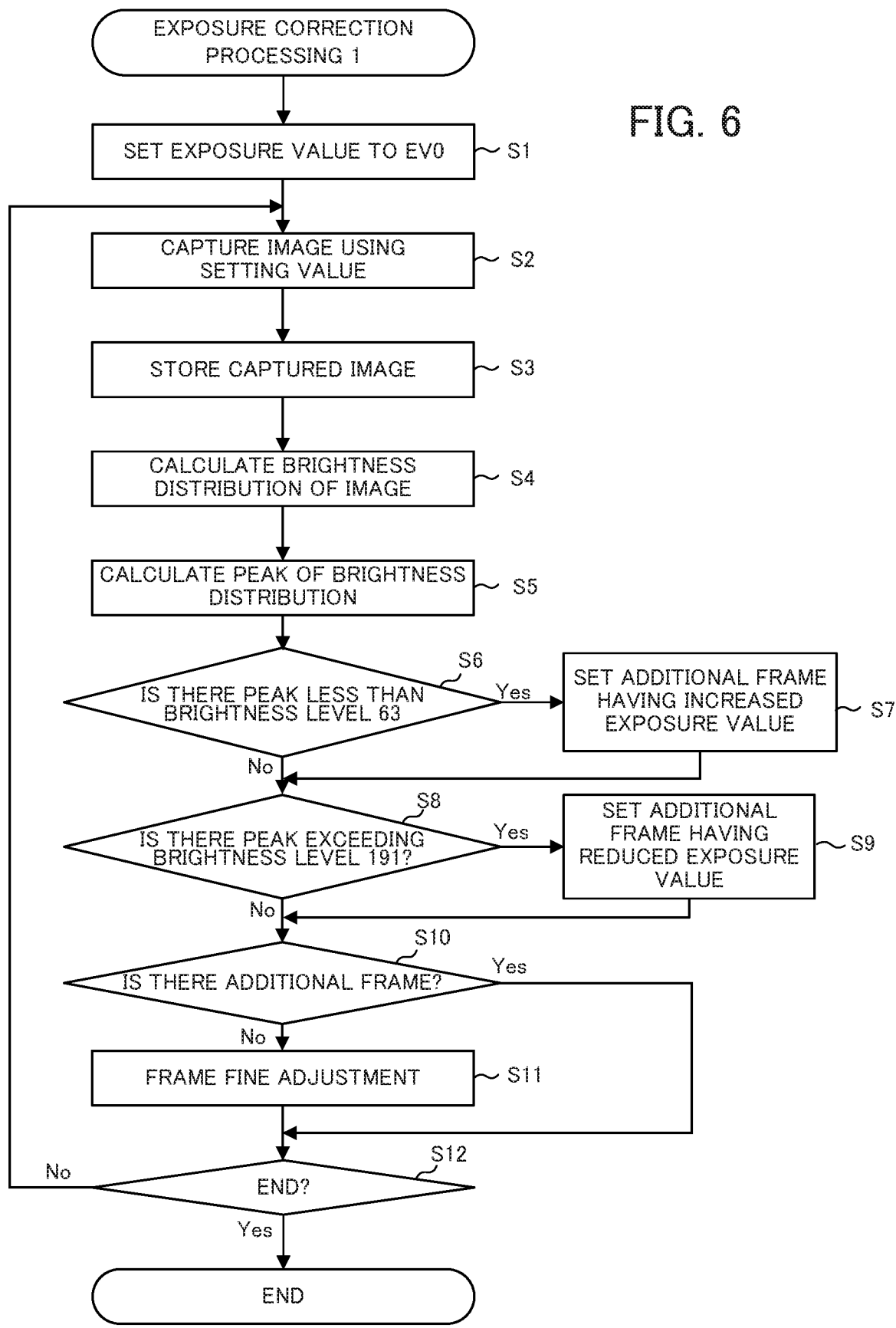
FIG. 6 is a flowchart of exposure correction processing 1 of the image processing device according to Embodiment 1 of the present disclosure.

The flow of the exposure correction processing 1 performed by the image processing device 10 is described while referencing FIG. 6. Due to the exposure correction processing 1, images can be captured by switching the exposure settings of the frames in accordance with the detection situation of a face in the image, as illustrated in FIGS. 5A to 5C. As a result, substantial reductions in the frame rate (perform imaging using only the reference frame when an additional frame is unnecessary) can be suppressed, and an additional frame can be used as necessary for the persons 101, 102 in the high brightness area 200 and the low brightness area 300 illustrated in FIG. 1 where the brightness/darkness difference is great. As such, the facial recognition device 80 can perform facial recognition more accurately.

First, the exposure setter 21 sets an exposure value EV (Exposure Value) 0 (aperture value F1, exposure time one second) of the first condition (reference frame), and stores the first exposure condition in the exposure condition storage section 31 (step S1).

Next, the image acquirer 22 references the exposure condition storage section 31 and causes the imager 40 to capture the image V in the imaging range L under the first exposure condition stored in the exposure condition storage section 31. In cases of returning from step S12, when an additional frame has been set in step S7 and/or step S9, as illustrated in FIG. 5B or FIG. 5C, the imager 40 is caused to alternately or sequentially image the reference frame and one or two additional frames under the first exposure condition and the second exposure condition described above (step S2).

The imaging device 41 of the imager 40 captures the image V in the imaging range L under the first exposure condition, and the image acquirer 22 acquires the captured image V. The image acquirer 22 stores the acquired image V in the image storage section 32. As described in the previous paragraph, when an additional frame is set, imaging is performed for the additional frame under the second exposure condition (described later) and the acquired image is stored in a similar manner (step S3).

The brightness distribution calculator 23 references the image storage section 32 and calculates the brightness distribution D of the image V stored in the image storage section 32. The brightness distribution calculator 23 stores the calculated brightness distribution D of the image V in the brightness distribution storage section 33 (step S4).

The brightness distribution calculator 23 calculates the peak P (P1, P2 . . . ) of the brightness distribution D (step S5).

The determiner 24 determines whether there is a peak P that is less than brightness level 63 (step S6). When there is a peak P that is less than brightness level 63 (step S6; Yes), an additional frame of the exposure value of the second condition, which has an increased exposure value, is set. The exposure setter 21 calculates, from the brightness level of the peak P of the brightness distribution D, a Δ that satisfies Equation (1), sets a value, obtained by multiplying the A by brightness level 127 of the reference exposure, as the exposure value of the second exposure condition, and stores the exposure value of the second exposure condition in the exposure condition storage section 31 (step S7). Then, step S8 is executed.

When there is not a peak P that is less than brightness level 63 (step S6; No), step S8 is executed.

The determiner 24 determines whether there is a peak P that exceeds brightness level 191 (step S8). When there is a peak P that exceeds brightness level 191 (step S8; Yes), an additional frame of the exposure value of the second exposure condition, which has a decreased exposure value, is set. The exposure setter 21 calculates the Δ of Equation (1) from the peak P of the brightness distribution D, sets a value, obtained by multiplying the Δ by brightness level 127 of the reference exposure, as the exposure value of the second exposure condition, and stores the exposure value of the second exposure condition in the exposure condition storage section 31 (step S9). Then, step S10 is executed.

When there is not a peak P that exceeds brightness level 191 (step S8; No), step S10 is executed.

The determiner 24 determines whether there is an additional frame (step S10). When there is an additional frame (step S10; Yes), step S12 is executed. When there is not an additional frame (step S10; No), step S11 is executed.

In step S11, the corrector 25 corrects the first exposure condition by multiplying the Δ, calculated by Equation (1), by the exposure value set in step S1 so as to achieve the brightness level 127, which is the median value of the brightness values, in the first exposure condition. Then, step S12 is executed.

When ending (step S12; Yes), the processing is ended. When not ending (step S12; No), step S2 is executed.

Thus, due to the exposure correction processing 1, in the brightness distribution D calculated by the brightness distribution calculator 23, when there is a peak P of the brightness distribution D of the captured image outside the predetermined range R, the exposure setter 21 sets an additional frame of an exposure value that corresponds to the brightness level of the peak P, and the image acquirer 22 acquires images captured in the reference exposure and the additional exposure frames. As a result, suitable image data can be sent to the facial recognition device 80. Additionally, the reference exposure frame is set even when the additional frame is set and, as such, the occurrence of face image detection omissions can be suppressed.

Exposure Tracking Processing

Figure 7:
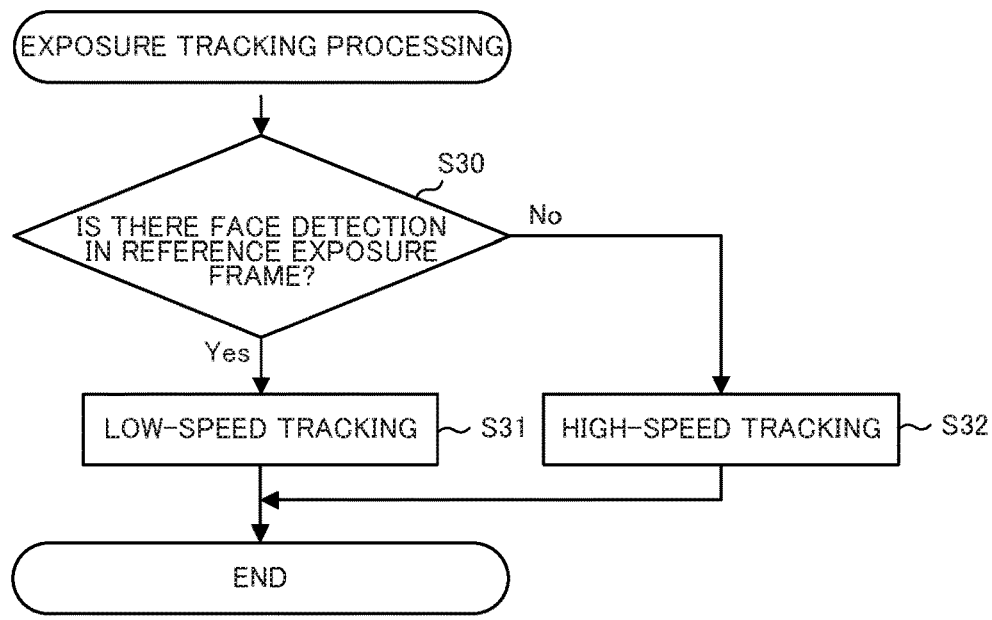
FIG. 7 is a flowchart of exposure tracking processing of the image processing device according to Embodiment 1 of the present disclosure.

The exposure tracking processing is described using FIG. 7. This processing is for controlling the fluctuation speed of exposure for each frame. In the case of a video to be viewed by humans, frame continuity is important. As such, restrictions are imposed on the fluctuation range of exposure for each frame with respect to exposure change. Meanwhile, in videos for machine authentication, changing to the optimal exposure as quickly as possible is more important than frame continuity. The goal is to acquire, as quickly as possible, images suitable for facial recognition. Note that exposure tracking is performed when face detection is carried out and, as such, the exposure tracking processing is executed when face detection is carried out in the reference exposure frame and/or the additional frame.

The determiner 24 determines whether a face is detected in the reference exposure frame, in which imaging under the first condition is performed (step S30). When a face is detected in the reference exposure frame (step S30; Yes), the exposure values are tracked at low speed to prioritize facial recognition of the current state (step S31), and the exposure tracking processing is ended.

When a face is not detected in the reference exposure frame, that is, when a face is detected in the additional frame (step S30; No), the exposure values are tracked at high speed (step S32), and the exposure tracking processing is ended.

Thus, due to this exposure tracking processing, the exposure values can be tracked as quickly as possible while reducing undesirable effects such as getting lost in following processing of a person for whom face detection is already performed in the reference frame.

Image Synthesis Processing 1

Figure 8:
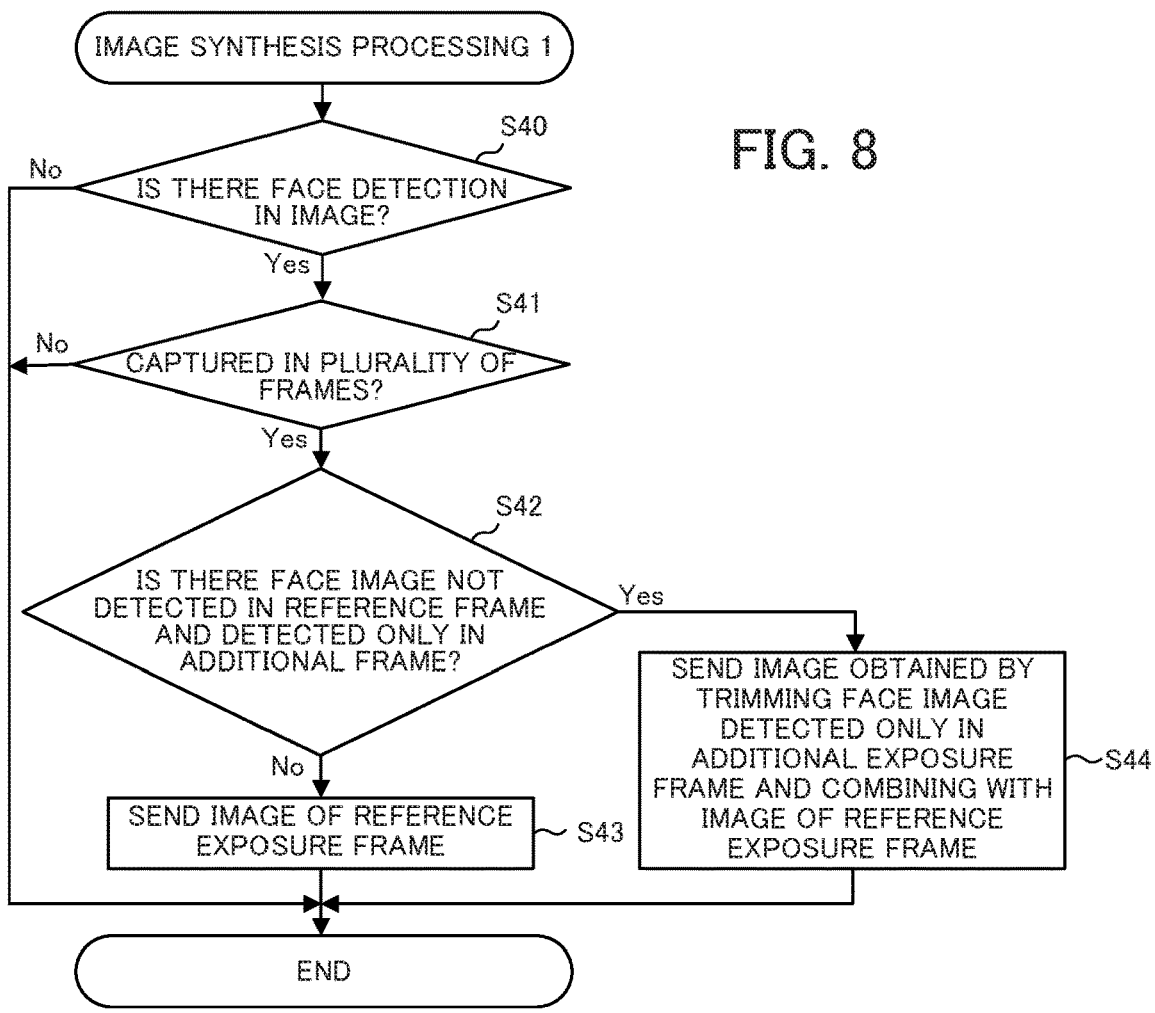
FIG. 8 is a flowchart of image synthesis processing 1 of the image processing device according to Embodiment 1 of the present disclosure.
Figure 9A:
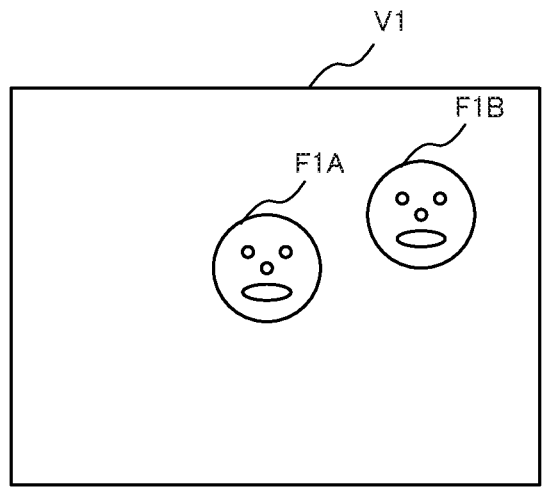
FIG. 9A is an image captured under typical settings.

Next, the image synthesis processing 1 is described using FIGS. 8 and 9. The image synthesis processing 1 is processing for synthesizing the image to be sent to the facial recognition device 80 in a case in which the image V is captured in a plurality of frames imaged under the reference and additional exposure conditions in the exposure correction processing 1 (hereinafter, the "plurality of frames imaged under the reference and additional exposure conditions" is simply referred to as "plurality of frames"; notation in the drawings is also made as "plurality of frames").

First, in FIG. 8, the determiner 24 determines whether face detection is carried out in the captured image V (step S40). If face detection is carried out in the image V (step S40: Yes), step S41 is executed.

The determiner 24 determines whether the imaging device 41 captures the image V in a plurality of frames (step S41). When the imaging device 41 captures the image V in a plurality of frames (step S41; Yes), step S42 is executed.

In step S42, the determiner 24 determines whether there is a face image that is not detected in the reference exposure frame and is detected only in the additional exposure frame. To accomplish this, the determiner 24 determines whether each of the face images detected in the additional exposure frame matches a face image detected in the reference exposure frame. Methods for determining whether the face images match in both frames include calculating feature values of the regions of the face images in both frames and performing matching using a predetermined algorithm; and calculating the difference between the feature values of the face images in both frames and determining that the face images are the same if the calculated difference is within a certain range. The face image, among the face images detected in the additional exposure frame, that does not match a face image detected in the reference exposure frame is the face image obtained in step S42. Note that, in cases in which the imaging target does not move or barely moves, it may be determined whether or not the face images match based on the positions of the face images or the like.

Figure 9B:
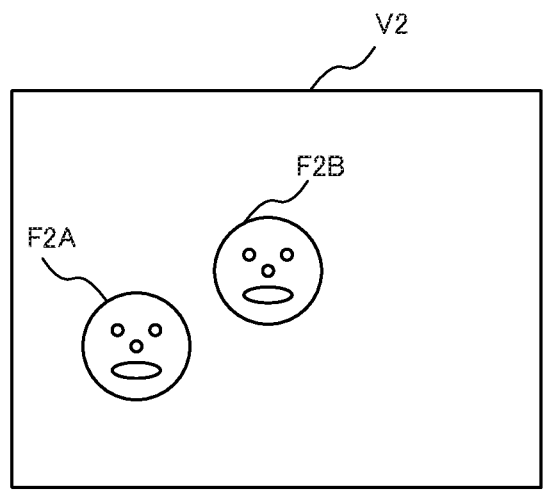
FIG. 9B is an image captured using a positive exposure value or a negative exposure value.
Figure 9C:
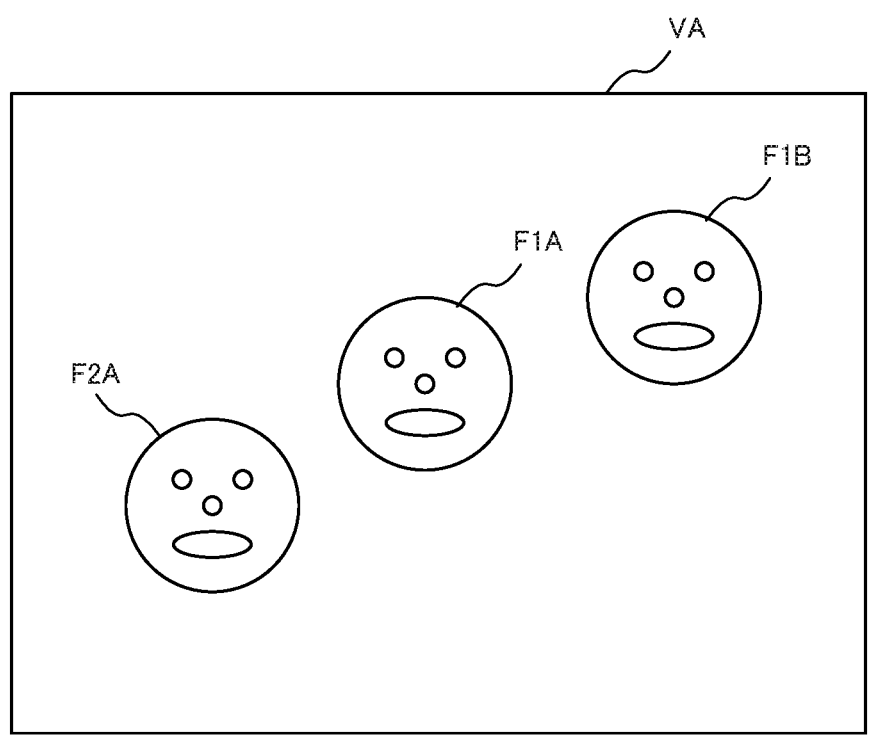
FIG. 9C is a drawing illustrating an image output by the image synthesis processing 1.

When there is not a face image that is not detected in the reference exposure frame and is only detected in the additional exposure frame (step S42; No), the image of the reference exposure frame is selected and sent to the facial recognition device 80 (step S43), and the image synthesis processing 1 is ended. When there is a face image that is not detected in the reference exposure frame and is only detected in the additional exposure frame (step S42; Yes), the reference exposure frame is selected, the image processor 26 trims the face image F2 detected only in the additional exposure frame, and synthesizes the image V1 by combining the trimmed face image F2 with the reference exposure frame. Then, the image sender 27 sends the image V1 to the facial recognition device 80 (step S44), and the image synthesis processing 1 is ended. In an example using FIG. 9, only the face image F2A, which is not detected in the image V1 of the reference exposure frame illustrated in FIG. 9A and is detected only in the image V2 of the additional exposure frame illustrated in FIG. 9B, is trimmed and combined with the image V1 to obtain an image VA illustrated in FIG. 9C, and this image VA is sent to the facial recognition device 80.

When face detection is not carried out in the captured image (step S40; No), and when the imaging device 41 does not capture the image V in a plurality of frames, that is, when the image V is captured only in the reference exposure frame (step S41; No), the image sender 27 sends the image V of the reference exposure frame to the facial recognition device 80 without modification (step S43), and the image synthesis processing 1 is ended.

Due to the image synthesis processing 1, image processing is executed in which only the face image (target) that cannot be detected in the reference exposure frame and can only be detected in the additional exposure frame is combined with the reference exposure frame. As a result, the image sent to the facial recognition device 80 is an image of the reference exposure frame, and only the face image that cannot be detected in the reference exposure frame is combined with the image of the reference exposure frame. As such, the amount of image data that is sent can be reduced.

Image Synthesis Processing 2

Figure 10:
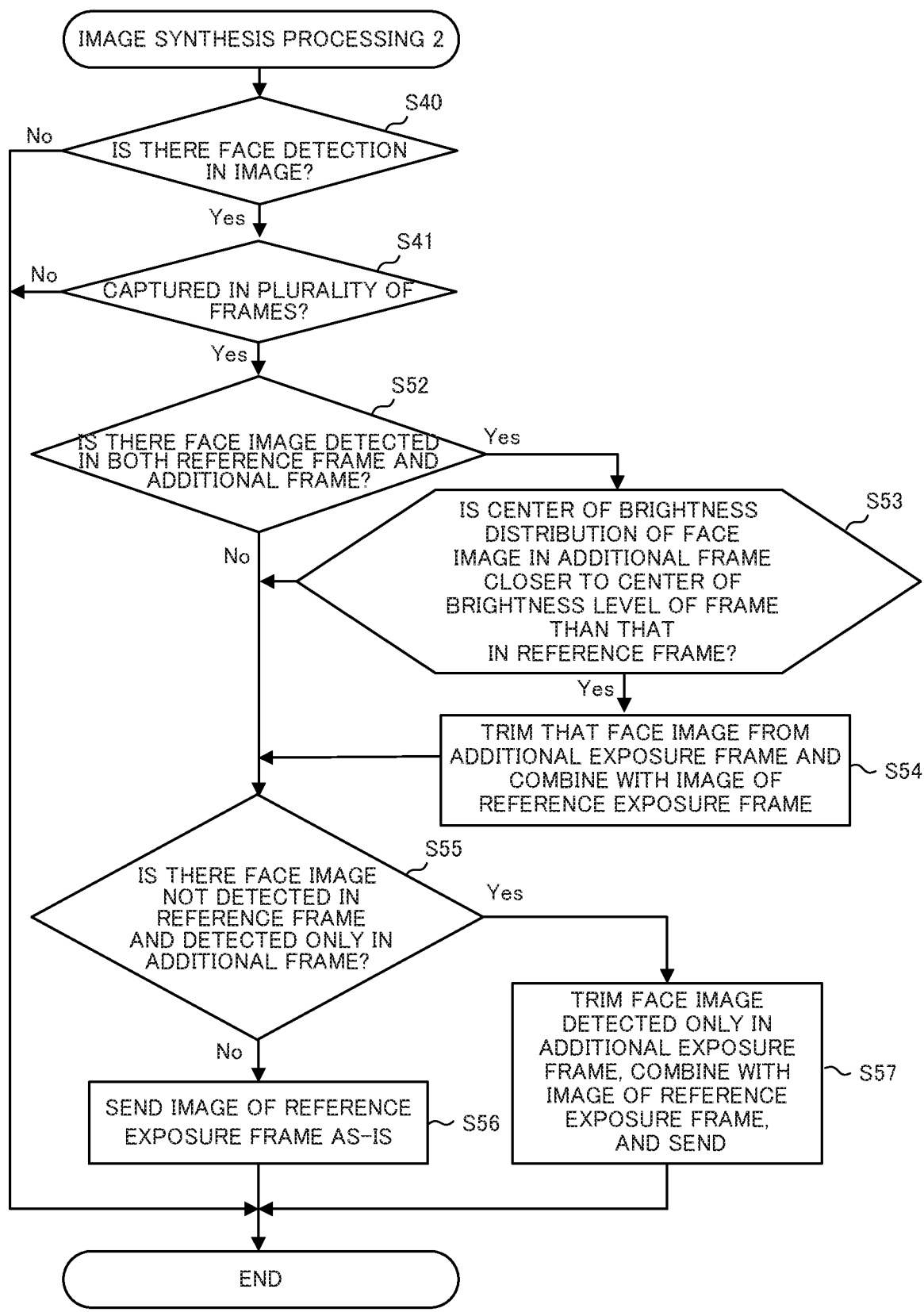
FIG. 10 is a flowchart of image synthesis processing 2 of the image processing device according to Embodiment 1 of the present disclosure.

Next, the image synthesis processing 2 is described using FIG. 10. In the image synthesis processing 1, the face image of the reference exposure frame is selected when the face image is detected in both the reference exposure frame and the additional exposure frame. However, in the image synthesis processing 2, when the face image is detected in both the reference exposure frame and the additional exposure frame, the face image in which the face image is expressed better is selected (for example, in FIG. 11, the face image of the additional exposure frame, in which the center A of the brightness distribution of the face is closer to the center C of the 12-bit brightness levels than the center B of the brightness distribution of the face of the reference exposure frame, is selected). By selecting the face image in which the center of the brightness distribution of the face is close to the center C of the 12-bit brightness levels, a wider brightness distribution of the face can be reflected in the image to be sent. The image synthesis processing 2 differs from the image synthesis processing 1 in that, for example, in a case in which the image V1 illustrated in FIG. 9A is captured in the reference exposure frame and the image V2 illustrated in FIG. 9B is captured in the additional exposure frame, it is determined whether to use the face image F1A illustrated in FIG. 9A or the face image F2B illustrated in FIG. 9B for the face image FB of the synthesized image VB illustrated in FIG. 12.

The processing of steps S40 and S41 are the same as in the image synthesis processing 1. The determiner 24 determines whether face detection is carried out in the captured image V (step S40). When face detection is carried out in the image V (step S40; Yes), the determiner 24 determines whether the imaging device 41 captures the image V in a plurality of frames (step S41). When the imaging device 41 captures the image V in a plurality of frames (step S41; Yes), step S52 is executed. When face detection is not carried out in the image V (step S40; No), and the imaging device 41 does not capture the image V in a plurality of frames (step S41; No), the image synthesis processing 2 is ended.

In step S52, the determiner 24 determines whether there is a face image that is detected in both the reference exposure frame and the additional exposure frame. To accomplish this, as in step S42, the determiner 24 determines whether each face image detected in the additional exposure frame matches a face image detected in the reference exposure frame. The method for determining whether the face images in both frames match is the same as the method described in step S42. When there is a face image detected in both the reference exposure frame and the additional exposure frame (step S52; Yes), step S53 is executed. When there is not a face image detected in both the reference exposure frame and the additional exposure frame (step S52; No), step S55 is executed.

Figure 11:
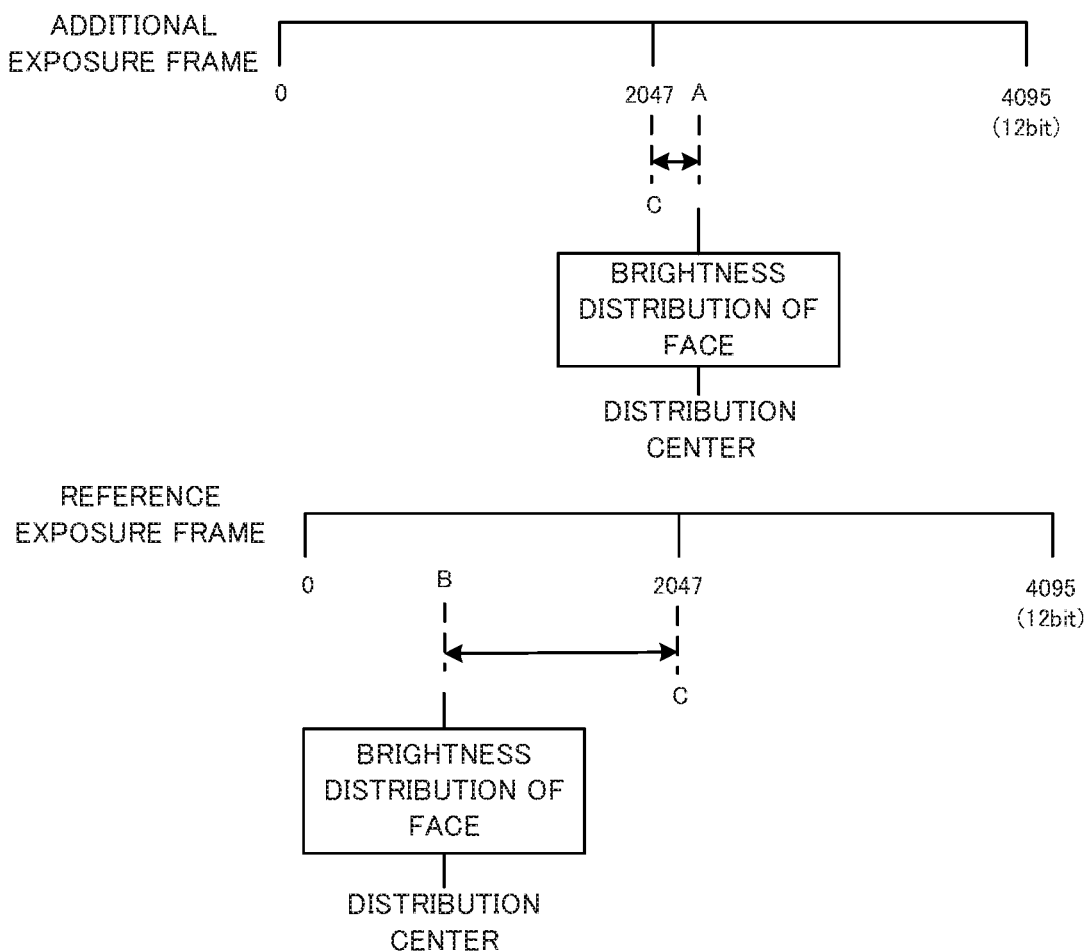
FIG. 11 is a drawing illustrating a comparison, performed in FIG. 10, of distances between a center of a brightness distribution of a face and a center of brightness levels.
Figure 12:
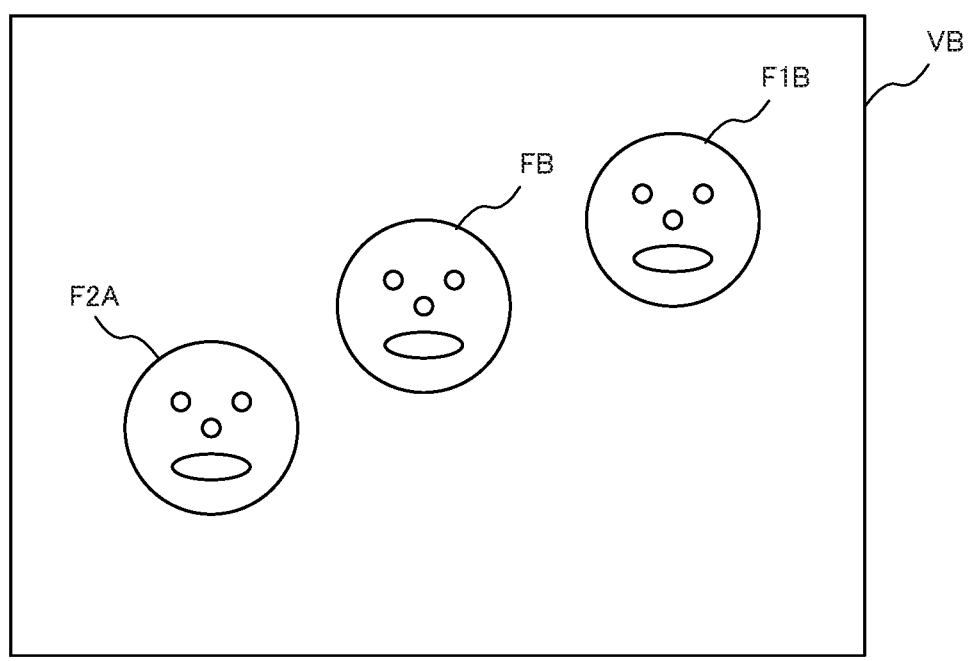
FIG. 12 is a drawing illustrating an image output by the image synthesis processing 2.

In step S53, the determiner 24 determines whether the center of the brightness distribution of the face image detected in both the reference exposure frame and the additional exposure frame is closer to the center of the brightness levels in the additional exposure frame than to the center of the brightness levels in the reference exposure frame (step S53). That is, the determiner 24 determines whether a state such as illustrated in FIG. 11 is realized. This is processing for selecting the face image of the frame in which the center of the brightness distribution of the detected face image is close to the center of the brightness levels in a case of 12-bit resolution.

When the center of the brightness distribution of the face image detected in both the reference exposure frame and the additional exposure frame is closer to the center C of the brightness levels of the additional exposure frame in a case of 12-bit resolution than to the center C of the brightness levels of the reference exposure frame in a case of 12-bit resolution (step S53; Yes), that face image is trimmed from the additional exposure frame, combined with the image of the reference exposure frame (step S54), and step S55 is executed. When the center of the brightness distribution of the face image detected in both the reference exposure frame and the additional exposure frame is not closer to the center of the brightness levels of the additional exposure frame than to the center of the brightness levels of the reference exposure frame (including cases in which the distances are equal) (step S53; No), step S55 is executed without performing the image synthesis.

In step S55, the determiner 24 determines whether there is a face image that is not detected in the reference exposure frame yet is detected in the additional exposure frame only. To accomplish this, as in steps S42 and S52, the determiner 24 determines whether each face image detected in the additional exposure frame matches a face image detected in the reference exposure frame. The method for determining whether the face images in both frames match is the same as the method described in step S42.

In step S55, when there is a face image that is not detected in the reference exposure frame and is detected only in the additional exposure frame (step S55; Yes), the face image detected only in the additional exposure frame is trimmed and combined with the image captured in reference exposure frame (in a case of step S53; Yes, the image with which the face image detected in the additional exposure frame is already combined in part), the synthesized image is sent to the facial recognition device 80 (step S57), and the image synthesis processing 2 is ended.

When there is not a face image that is not detected in the reference exposure frame and is detected only in the additional exposure frame (step S55; No), the image sender 27 sends the image captured in the reference exposure frame without modification (in a case of step S53; Yes, the image with which the face image detected in the additional exposure frame is already combined in part) to the facial recognition device 80, and the image synthesis processing 2 is ended.

Thus, due to the image synthesis processing 2, when a face image (target) is detected in both the reference exposure frame and the additional exposure frame, the face image of the frame in which the center of the brightness distribution of the face image is close to the center of the brightness levels in a case of 12-bit resolution is selected. Improvements in facial recognition accuracy are anticipated by selecting the face image in which the face image is expressed better.

Embodiment 2

In Embodiment 1, when there is a peak P of the brightness distribution D of the captured image outside the predetermined range R, alternately imaging the reference exposure frame and the additional exposure frame one frame at a time is performed. However, in the present embodiment, when imaging is performed using the reference exposure frame and the additional exposure frame, the frequency of the switching of the frames is adjusted.

In the present embodiment, the configuration of the facial recognition system 1 and the configuration of the image processing device 10 are the same as in Embodiment 1. With the exception of the exposure correction processing 1, the various processings performed in Embodiment 2 are performed in the same manner as in Embodiment 1. However, some functions are added to the controller 20 and the storage 30. Hereinafter, these additional functions are described.

In cases in which the second exposure condition is set, the exposure setter 21 sets a frequency of switching between imaging under the first exposure condition and imaging under the second exposure condition. When a face image that is the primary subject is detected under only the second exposure condition, as illustrated in FIG. 15A, imaging under the first exposure condition and imaging under the second exposure condition are alternately switched one frame at a time. When the same face image is detected under the first exposure condition and the second exposure condition, as illustrated in FIG. 15B, switching is carried out such that four frames are imaged under the first exposure condition and then one frame is imaged under the second exposure condition. The exposure setter 21 also stores the frequency at which the imaging is switched in the exposure condition storage section 31. Note that the determiner 24 determines the exposure condition under which the face image is detected.

The determiner 24 determines whether the face image can be confirmed in the image captured under the first exposure condition and in the image captured under the second exposure condition. The determination result is sent to the exposure setter 21.

In the present embodiment, an exposure value of +2EV is set in the exposure condition storage section 31 as the second exposure condition.

The additional functions are described above. Hereinafter, a specific description is given, while referencing FIGS. 4B, 15A, 15B, and 16, of exposure correction performed by the image processing device 10 of the present embodiment.

As illustrated in FIG. 4B, when the peak P1 of the brightness distribution D is less than the predetermined range R and the peak P2 is in the predetermined range R, as illustrated in FIG. 15B, the imaging device 41 switches the frames based on the exposure values of the first exposure condition (reference exposure Ref (0EV)) and the second exposure condition (Positive exposure (+2EV)), and performs imaging at 30 fps. At this time, when a face image that is the primary subject is detected only under the second exposure condition, as illustrated in FIG. 15A, imaging under the first exposure condition and imaging under the second exposure condition are alternately switched one frame at a time. The frame rate is reduced to ½ because the face image is detected only under the second exposure condition. Since an image that is captured under the first exposure condition is selected and used for the background, the frame rate of the background is reduced to ½, or 15 fps.

When the same face image is detected under the first exposure condition and the second exposure condition, or when the face image is not detected under the second exposure condition, as illustrated in FIG. 15B, the frames are switched such that four frames are imaged under the first exposure condition and then one frame is imaged under the second exposure condition, and imaging is performed at 30 fps. Since four out of five frames are imaged under the first exposure condition, the frame rate of the reference frame is reduced to ⅘. Since an image that is captured under the first exposure condition is selected and used as the background, the frame rate of the background is reduced to ⅘, or 24 fps. When performing imaging under the first exposure condition and the second exposure condition in Embodiment 1, reductions of the frame rate of the reference frame can be made smaller than in the case illustrated in FIG. 15A.

Figure 16:
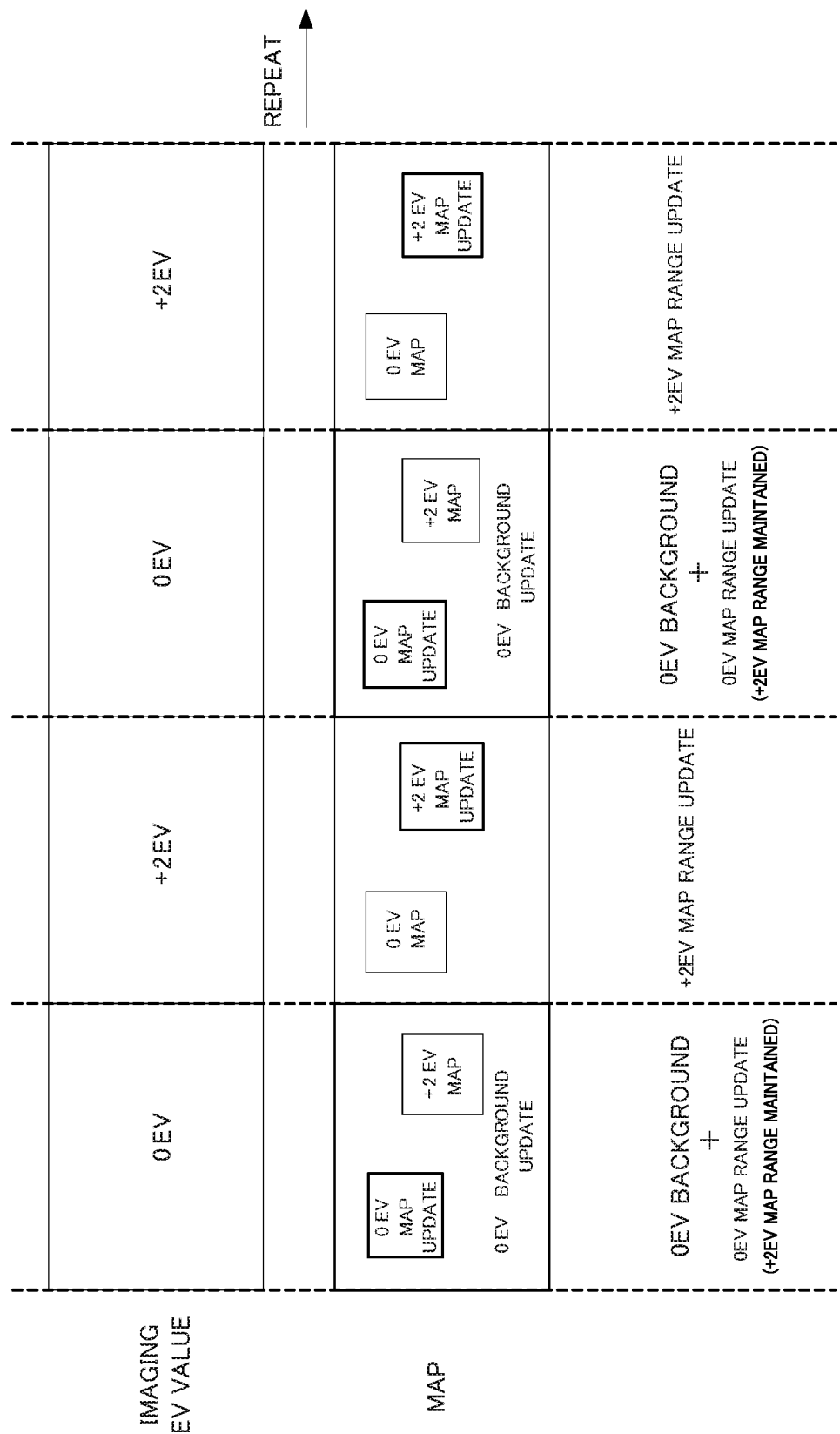
FIG. 16 is a drawing illustrating a synthesis method of an image of the image processing device according to Embodiment 2 of the present disclosure.

In the cases illustrated in FIGS. 15A and 15B as well, as illustrated in FIG. 16, placement coordinates for the face image, captured under the second exposure condition, are made to correspond with and are combined with the face image and the background captured under the first exposure condition, a MAP image is generated, and the image when imaging under each exposure condition is updated.

Exposure Correction Processing 2

Figure 17:
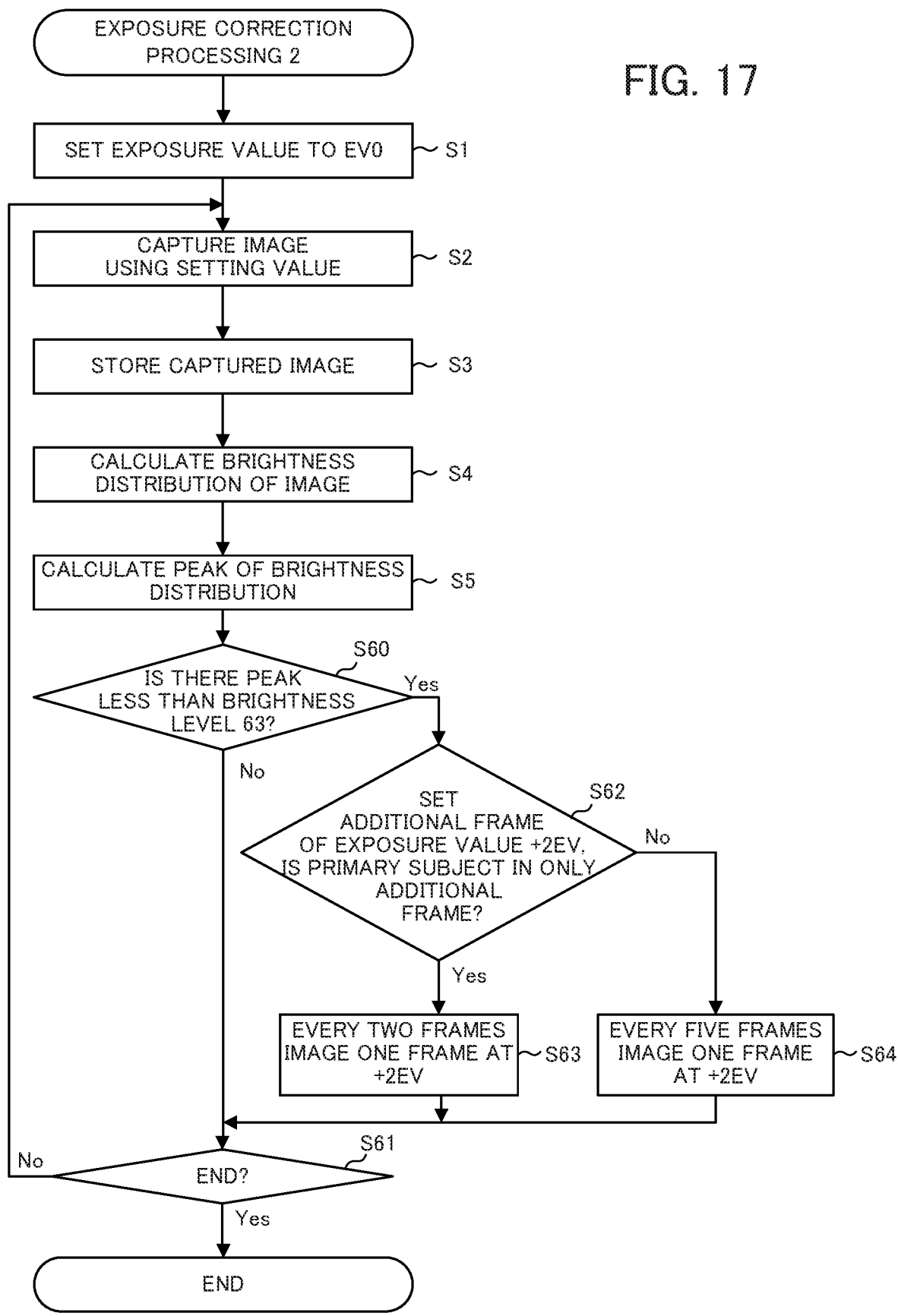
FIG. 17 is a flowchart of exposure correction processing 2 of the image processing device according to Embodiment 2 of the present disclosure.

Next, exposure correction processing 2 performed in the present embodiment instead of the exposure correction processing 1 performed in Embodiment 1 is described while referencing FIG. 17. Due to the exposure correction processing 2, the exposure settings of the frames can be switched in accordance with the detection situation of faces in the images, and the switching frequency of the frames can be adjusted to capture images. Note that, in the exposure correction processing 2, for the sake of ease of description, the second exposure condition is only +2EV, which is the value that is set when there is a peak P that is less than brightness level 63.

In steps S1 to S5 of the exposure correction processing 2, the same processing as in the exposure correction processing 1 is performed and, then, step S60 is executed.

In step S60, the determiner 24 determines whether there is, in the brightness distribution D of the image V in the imaging range L, a peak P that is less than brightness level 63 such as illustrated in FIGS. 4B and 4C, for example.

When there is not a peak P that is less than brightness level 63 (step S60; No), step S61 is executed.

When there is a peak P that is less than brightness level 63 (step S60; Yes), the exposure setter 21 sets an additional frame of +2EV, which is the exposure value of the second condition that has an increased exposure value. The determiner 24 determines whether the face is detected only in the frame imaged under the second exposure condition.

When the face is detected only in the frame imaged under the second exposure condition (step S62; Yes), the determiner 24 sends the determination result to the exposure setter 21. The exposure setter 21 sets so that imaging under the first exposure condition and imaging under the second exposure condition are alternately switched one frame at a time (step S63). After the setting, step S61 is executed.

When the face is not detected in the frame imaged under the second exposure condition or the face is detected in the frames imaged under the first and second exposure conditions (step S62; No), the determiner 24 sends the determination result to the exposure setter 21. The exposure setter 21 sets so that switching is carried out such that four frames are imaged under the first exposure condition and then one frame is imaged under the second exposure condition (step S64). After the setting, step S61 is executed.

When ending (step S61; Yes), the exposure correction processing 2 is ended. When not ending (step S61; No), step S2 is executed.

Thus, due to the exposure correction processing 2, in the brightness distribution D calculated by the brightness distribution calculator 23, when there is a peak P of the brightness distribution D of the captured image that is less than the predetermined range R (less than brightness level 63), the exposure setter 21 sets an additional frame of the exposure value +2EV and sets the switching frequency of the frames according to whether the face is detected only in the additional exposure frame, and the image acquirer 22 acquires images captured in the reference exposure and the additional exposure frames. When the face is detected only in the additional exposure frame, the reference exposure and the additional exposure frames are alternately imaged one frame at a time; and when the same face is detected in the reference exposure and the additional exposure frames, or when the face image is not detected in the additional exposure frame, the frequency of imaging under the additional exposure is reduced (or the frequency of imaging under the reference exposure is increased). As a result, image data that is more suitable can be sent to the facial recognition device 80. Moreover, the reference exposure frame is set even when the additional frame is set and, as such, the occurrence of face image detection omissions can be suppressed.

MODIFIED EXAMPLES

Figure 13:
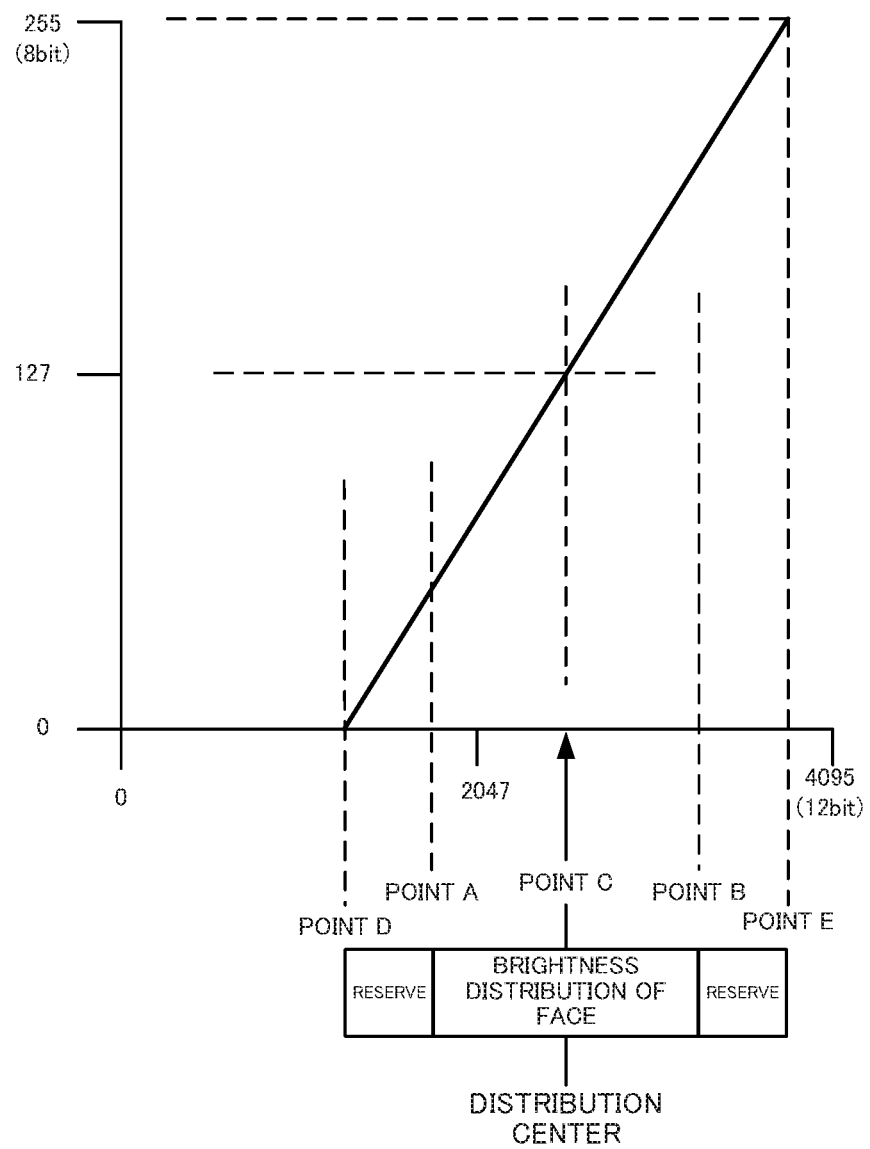
FIG. 13 is a drawing illustrating an example in which an image obtained from the image processing device according to Embodiment 1 of the present disclosure is converted from 12-bit to 8-bit.
Figure 14:
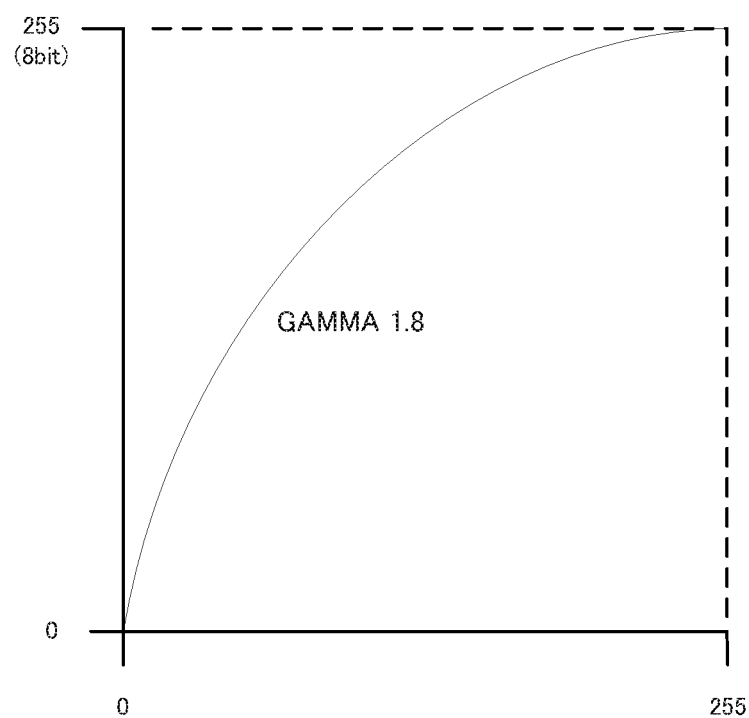
FIG. 14 is a drawing illustrating an example of a gamma curve of gamma correction of the image processing device according to Embodiment 1 of the present disclosure.

In the embodiments described above, the image processing device 10 simply compresses the 12-bit Bayer image to 8 bits. However, a configuration can be made in which, for example, compression is performed such that the tone of the face is maximized, as illustrated in FIG. 13. It is preferable that, after the brightness distribution calculator 23 calculates the brightness distribution, a gamma table is used that aligns the center C of the brightness distribution of the face with the center of the 8-bit brightness distribution and linearly converts from a point D to a point E, where reserved regions for a certain measurement error from a minimum value A and a maximum value B of the brightness distribution of the face are secured. Additionally, gamma curve correction as illustrated in FIG. 14 may be carried out. Moreover, in FIG. 2, the gamma correction may have a two-stage configuration.

In the embodiments described above, the image processing device 10 performs image processing and the like for the facial recognition device 80. However, a configuration can be made in which the image processing device 10 performs image processing and the like for an image recognition device that performs person detection or objects (vehicles or the like) detection in which, instead of a face, a person, an object, or the like is the target. Additionally, the target and the subject may be the same or, for example, the target may be a face, and the subject may be a person.

In Embodiment 1 described above, as illustrated in FIGS. 5B and 5C the image processing device 10 images by alternately changing frames each frame. However, configurations can be made in which imaging is performed by alternately changing frames every two frames, three frames, or four frames, or every one second, five seconds, or ten seconds.

In the embodiments described above, the image processing device 10 sends a synthesized image or an image at one frame rate to the facial recognition device 80. However, a configuration can be made in which images at all of the set frame rates are sent and the processing related to image synthesis and the like is omitted.

In the embodiments described above, the monitoring video also includes a frame-by-frame video such as a time-lapse video.

In the embodiments described above, the second exposure condition is set in cases in which there is a peak P of the brightness distribution that is outside the predetermined range R. However, a configuration can be made in which the second exposure condition is set in cases in which there are a plurality of peaks P of the brightness distribution.

In the embodiments described above, the first exposure condition is 18% gray. However, when the imaging target includes many dark locations or many bright locations, the first exposure condition may be set as desired by the user.

In the embodiments described above, the image processing device 10 includes the imager 40. However, a configuration can be made in which the image processing device does not include an imager, and is connected to an external imaging device via the communicator 50.

In the embodiments described above, the image processing device 10 generates an image for the facial recognition device 80 that performs two-dimensional facial recognition. However, a configuration can be made in which the image processing device 10 generates an image for a facial recognition device that performs three-dimensional facial recognition.

In the embodiments described above, the additional frame is set in cases in which there is a peak P of the image V outside the predetermined range R. However, a configuration can be made in which the additional frame is set in cases in which there are a plurality of peaks P of the image V, in cases in which a peak of the image V is not found, and the like.

In the embodiments described above, for the Positive exposure and the Negative exposure, the exposure values are adjusted by Equation (1). However, the exposure values may be changed in accordance with a difference between the value of the brightness level at the distribution center of the peak and the value at the center of the range of brightness level values. Alternatively, the Positive exposure and Negative exposure may be preset exposure values such as +3EV, −3EV, or the like.

In the embodiments described above, in the image synthesis processings 1 and 2, a face image trimmed from an image captured in an additional exposure frame is combined with an image captured in a reference exposure frame. However, a configuration can be made in which a target such as a face image or the like that is captured under the reference exposure is trimmed and combined with an image captured in an additional exposure frame.

In the embodiments described above, the image synthesis processings 1 and 2 and the like are performed by combining a face image trimmed from an image captured in an additional exposure frame with an image captured in a reference exposure frame. However, a configuration can be made in which image synthesis is not performed, and the images are made to correspond by embedding coordinate information in a file tag of the trimmed face image or the like.

In Embodiment 2 described above, when a face image is detected only under the second exposure condition, the imaging under the first exposure condition and the imaging under the second exposure condition is alternately switched one frame at a time; and, when the same face image is detected under the first exposure condition and the second exposure condition, and when the face image is not detected under the second exposure condition, switching is performed such that four frames are imaged under the first exposure condition and then one frame is imaged under the second exposure condition. However, the frequency of the switching of the frames can be set as desired. For example, a configuration can be made in which, when a face image is detected only under the second exposure condition, the frames are switched such that one frame is imaged under the first exposure condition and then four frames are imaged under the second exposure condition, thereby placing a greater weighting on the second exposure condition than on the first exposure condition. Alternatively, a configuration can be made in which the frequency at which the frames are switched is calculated in accordance with face image detection frequency under each exposure condition or the like.

In Embodiment 2 described above, when different face images are detected under the first exposure condition and the second exposure condition, and when a face image is detected only under the second exposure condition, imaging under the first exposure condition and imaging under the second exposure condition are alternately switched one frame at a time; and, when a face image is not detected under the second exposure condition, switching may be carried out such that four frames are imaged under the first exposure condition and then one frame is imaged under the second exposure condition, or the frequency at which the frames are switched may be changed by another condition. For example, when a face image under one exposure condition is detected at a predetermined position, switching may be carried out such that four frames are imaged under that exposure condition and then one frame is imaged under another exposure condition; when a face image of a predetermined size or larger is detected under one exposure condition, switching may be carried out such that four frames are imaged under that exposure condition and then one frame is imaged under another exposure condition; or the like.

In Embodiment 2 described above, the second exposure condition is set as +2EV. However, a configuration can be made in which a different value is set for the second exposure condition or the second exposure condition is calculated by a method such as that in Embodiment 1. Additionally, two second exposure conditions may be set as in Embodiment 1, or three or more second exposure conditions may be set. Furthermore, in the exposure correcting processing 2, fine adjustment of the frames may be performed similar to step S11. Alternatively, a part or all of the processing of the exposure correction processing 2 may be incorporated into the exposure correction processing 1.

In Embodiment 2, an image captured under the first exposure condition is used for the background of the MAP image. However, a configuration can be made in which an image captured under the second exposure condition is used for the background. When the background is dark or bright, or the like, there are cases in which it is preferable to use an image captured under the second exposure condition for the background.

Note that the various functions of the image processing device 10 can be implemented by a computer such as a typical personal computer (PC). Specifically, in the embodiments described above, an example is described in which the programs of the exposure correction processings 1 and 2 and the image processing, which are executed by the image processing device 10, are stored in advance in the ROM of the storage 30. However, a computer may be configured that is capable of realizing these various features by storing and distributing the programs on a non-transitory computer-readable recording medium such as a compact disc read-only memory (CD-ROM), a digital versatile disc (DVD), and a magneto-optical disc (MO), and reading out and installing these programs on the computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An image processing device, comprising:
a memory configured to store a program; and
at least one processor configured to execute the program stored in the memory,
wherein the processor, under control of the program, is configured to:
set an exposure condition for imaging a monitoring video;
acquire an image included in the monitoring video imaged under the set exposure condition; and
calculate a brightness distribution from the acquired image,
wherein the exposure condition includes (i) a first exposure condition for causing an imaging device to capture the image using a first exposure value, and (ii) a second exposure condition for at least one of causing the imaging device to capture the image using an exposure value higher than the first exposure value and causing the imaging device to capture the image using an exposure value lower than the first exposure value,
wherein the processor sets the first exposure condition or sets the first exposure condition and the second exposure condition as the exposure condition for imaging, based on the brightness distribution of the image captured under the first exposure condition after the first exposure condition is set, and
wherein the processor sets the second exposure condition when at least one peak, from among brightness level value peaks in the brightness distribution of the image captured under the first exposure condition, is outside a predetermined range of brightness level values.

2. The image processing device according to claim 1, wherein the second exposure condition is an exposure condition that causes the image to be captured using the exposure value higher than the first exposure value when at least one of the peaks is in a range lower than the predetermined range of brightness level values, and is an exposure condition that causes the image to be captured using the exposure value lower than the first exposure value when at least one of the peaks is in a range higher than the predetermined range of brightness level values.

3. The image processing device according to claim 1, wherein the processor changes the exposure value of the second exposure condition in accordance with a difference between a brightness level value of a distribution center of the peaks and a value of a center of the predetermined range of brightness level values.

4. An image processing device, comprising:
a memory configured to store a program; and
at least one processor configured to execute the program stored in the memory,
wherein the processor, under control of the program, is configured to:
set an exposure condition for imaging a monitoring video;
acquire an image included in the monitoring video imaged under the set exposure condition; and
calculate a brightness distribution from the acquired image,
wherein the exposure condition includes (i) a first exposure condition for causing an imaging device to capture the image using a first exposure value, and (ii) a second exposure condition for at least one of causing the imaging device to capture the image using an exposure value higher than the first exposure value and causing the imaging device to capture the image using an exposure value lower than the first exposure value,
wherein the processor sets the first exposure condition or sets the first exposure condition and the second exposure condition as the exposure condition for imaging, based on the brightness distribution of the image captured under the first exposure condition after the first exposure condition is set, and
wherein the processor reduces a frequency of imaging under the second exposure condition or increases a frequency of imaging under the first exposure condition when a subject is not included in the image captured under the second exposure condition or a same subject is included in both the image captured under the first exposure condition and the image captured under the second exposure condition.

5. The image processing device according to claim 4, wherein the processor combines (i) a target that is not detected in an image captured under one of the first and second exposure conditions yet is detected in an image captured under the other of the first and second exposure conditions with (ii) an image captured under the one of the first and second exposure conditions.

6. The image processing device according to claim 5, wherein the target is the subject.

7. An image processing device, comprising:
a memory configured to store a program; and
at least one processor configured to execute the program stored in the memory,
wherein the processor, under control of the program, is configured to:
set an exposure condition for imaging a monitoring video;
acquire an image included in the monitoring video imaged under the set exposure condition; and
calculate a brightness distribution from the acquired image,
wherein the exposure condition includes (i) a first exposure condition for causing an imaging device to capture the image using a first exposure value, and (ii) a second exposure condition for at least one of causing the imaging device to capture the image using an exposure value higher than the first exposure value and causing the imaging device to capture the image using an exposure value lower than the first exposure value,
wherein the processor sets the first exposure condition or sets the first exposure condition and the second exposure condition as the exposure condition for imaging, based on the brightness distribution of the image captured under the first exposure condition after the first exposure condition is set, and wherein the processor increases a frequency of imaging under the second exposure condition or reduces a frequency of imaging under the first exposure condition when a subject is included only in the image captured under the second exposure condition.

8. An image processing device, comprising: a memory configured to store a program; and at least one processor configured to execute the program stored in the memory, wherein the processor, under control of the program, is configured to: set an exposure condition for imaging a monitoring video; acquire an image included in the monitoring video imaged under the set exposure condition; and calculate a brightness distribution from the acquired image, wherein the exposure condition includes (i) a first exposure condition for causing an imaging device to capture the image using a first exposure value, and (ii) a second exposure condition for at least one of causing the imaging device to capture the image using an exposure value higher than the first exposure value and causing the imaging device to capture the image using an exposure value lower than the first exposure value, wherein the processor sets the first exposure condition or sets the first exposure condition and the second exposure condition as the exposure condition for imaging, based on the brightness distribution of the image captured under the first exposure condition after the first exposure condition is set, and wherein the processor combines (i) a first image that is not detected in an image captured under one of the first and second exposure conditions yet is detected in an image captured under the other of the first and second exposure conditions and (ii) a second image that is detected in the image captured under the first exposure condition and is detected in the image captured under the second exposure condition with (iii) the image captured under the one of the first and second exposure conditions, a value of a peak of a brightness level of the second image in the image captured under the other of the first and second exposure conditions being closer to a median value of brightness levels under each of the exposure conditions than a value of a peak of a brightness level of the second image in the image captured under the one of the first and second exposure conditions.

9. An image processing method, comprising:

setting an exposure condition for imaging a monitoring video, the exposure condition including (i) a first exposure condition for causing an imaging device to capture, using a first exposure value, an image included in the monitoring video imaged under the set exposure condition, and (ii) a second exposure condition for at least one of causing the imaging device to capture the image using an exposure value higher than the first exposure value and causing the imaging device to capture the image using an exposure value lower than the first exposure value;

acquiring the image included in the monitoring video imaged under the set exposure condition;

calculating a brightness distribution from the acquired image;

setting the first exposure condition or setting the first exposure condition and the second exposure condition as the exposure condition for imaging, based on the brightness distribution of the image captured under the first exposure condition after the first exposure condition is set; and setting the second exposure condition when at least one peak, from among brightness level value peaks in the brightness distribution of the image captured under the first exposure condition, is outside a predetermined range of brightness level values.

10. An image processing method, comprising:

setting an exposure condition for imaging a monitoring video, the exposure condition including (i) a first exposure condition for causing an imaging device to capture, using a first exposure value, an image included in the monitoring video imaged under the set exposure condition, and (ii) a second exposure condition for at least one of causing the imaging device to capture the image using an exposure value higher than the first exposure value and causing the imaging device to capture the image using an exposure value lower than the first exposure value;

acquiring the image included in the monitoring video imaged under the set exposure condition;

calculating a brightness distribution from the acquired image;

setting the first exposure condition or setting the first exposure condition and the second exposure condition as the exposure condition for imaging, based on the brightness distribution of the image captured under the first exposure condition after the first exposure condition is set; and reducing a frequency of imaging under the second exposure condition or increasing a frequency of imaging under the first exposure condition when a subject is not included in the image captured under the second exposure condition or a same subject is included in both the image captured under the first exposure condition and the image captured under the second exposure condition.

11. An image processing method, comprising:

setting an exposure condition for imaging a monitoring video, the exposure condition including (i) a first exposure condition for causing an imaging device to capture, using a first exposure value, an image included in the monitoring video imaged under the set exposure condition, and (ii) a second exposure condition for at least one of causing the imaging device to capture the image using an exposure value higher than the first exposure value and causing the imaging device to capture the image using an exposure value lower than the first exposure value;

acquiring the image included in the monitoring video imaged under the set exposure condition;

calculating a brightness distribution from the acquired image;

setting the first exposure condition or setting the first exposure condition and the second exposure condition as the exposure condition for imaging, based on the brightness distribution of the image captured under the first exposure condition after the first exposure condition is set; and increasing a frequency of imaging under the second exposure condition or reducing a frequency of imaging under the first exposure condition when a subject is included only in the image captured under the second exposure condition.

12. An image processing method, comprising: setting an exposure condition for imaging a monitoring video, the exposure condition including (i) a first exposure condition for causing an imaging device to capture, using a first exposure value, an image included in the monitoring video imaged under the set exposure condition, and (ii) a second exposure condition for at least one of causing the imaging device to capture the image using an exposure value higher than the first exposure value and causing the imaging device to capture the image using an exposure value lower than the first exposure value; acquiring the image included in the monitoring video imaged under the set exposure condition; calculating a brightness distribution from the acquired image; setting the first exposure condition or setting the first exposure condition and the second exposure condition as the exposure condition for imaging, based on the brightness distribution of the image captured under the first exposure condition after the first exposure condition is set; and combining (i) a first image that is not detected in an image captured under one of the first and second exposure conditions yet is detected in an image captured under the other of the first and second exposure conditions and (ii) a second image that is detected in the image captured under the first exposure condition and is detected in the image captured under the second exposure condition with (iii) the image captured under the one of the first and second exposure conditions, a value of a peak of a brightness level of the second image in the image captured under the other of the first and second exposure conditions being closer to a median value of brightness levels under each of the exposure conditions than a value of a peak of a brightness level of the second image in the image captured under the one of the first and second exposure conditions.

13. A non-transitory computer-readable recording medium having stored therein a program that is executable by a processor of a computer to control the processor to execute processes comprising:
   setting an exposure condition for imaging a monitoring video, the exposure condition including (i) a first exposure condition for causing an imaging device to capture, using a first exposure value, an image included in the monitoring video imaged under the set exposure condition, and (ii) a second exposure condition for at least one of causing the imaging device to capture the image using an exposure value higher than the first exposure value and causing the imaging device to capture the image using an exposure value lower than the first exposure value;
   acquiring the image included in the monitoring video imaged under the set exposure condition;
   calculating a brightness distribution from the acquired image;
   setting the first exposure condition or setting the first exposure condition and the second exposure condition as the exposure condition for imaging, based on the brightness distribution of the image captured under the first exposure condition after the first exposure condition is set; and
   setting the second exposure condition when at least one peak, from among brightness level value peaks in the brightness distribution of the image captured under the first exposure condition, is outside a predetermined range of brightness level values.

14. A non-transitory computer-readable recording medium having stored therein a program that is executable by a processor of a computer to control the processor to execute processes comprising:
   setting an exposure condition for imaging a monitoring video, the exposure condition including (i) a first exposure condition for causing an imaging device to capture, using a first exposure value, an image included in the monitoring video imaged under the set exposure condition, and (ii) a second exposure condition for at least one of causing the imaging device to capture the image using an exposure value higher than the first exposure value and causing the imaging device to capture the image using an exposure value lower than the first exposure value;
   acquiring the image included in the monitoring video imaged under the set exposure condition;
   calculating a brightness distribution from the acquired image;
   setting the first exposure condition or setting the first exposure condition and the second exposure condition as the exposure condition for imaging, based on the brightness distribution of the image captured under the first exposure condition after the first exposure condition is set; and
   reducing a frequency of imaging under the second exposure condition or increasing a frequency of imaging under the first exposure condition when a subject is not included in the image captured under the second exposure condition or a same subject is included in both the image captured under the first exposure condition and the image captured under the second exposure condition.

15. A non-transitory computer-readable recording medium having stored therein a program that is executable by a processor of a computer to control the processor to execute processes comprising:
   setting an exposure condition for imaging a monitoring video, the exposure condition including (i) a first exposure condition for causing an imaging device to capture, using a first exposure value, an image included in the monitoring video imaged under the set exposure condition, and (ii) a second exposure condition for at least one of causing the imaging device to capture the image using an exposure value higher than the first exposure value and causing the imaging device to capture the image using an exposure value lower than the first exposure value;
   acquiring the image included in the monitoring video imaged under the set exposure condition;
   calculating a brightness distribution from the acquired image;
   setting the first exposure condition or setting the first exposure condition and the second exposure condition as the exposure condition for imaging, based on the brightness distribution of the image captured under the first exposure condition after the first exposure condition is set; and
   increasing a frequency of imaging under the second exposure condition or reducing a frequency of imaging under the first exposure condition when a subject is included only in the image captured under the second exposure condition.

16. A non-transitory computer-readable recording medium having stored therein a program that is executable by a processor of a computer to control the processor to execute processes comprising: setting an exposure condition for imaging a monitoring video, the exposure condition including (i) a first exposure condition for causing an imaging device to capture, using a first exposure value, an image included in the monitoring video imaged under the set exposure condition, and (ii) a second exposure condition for at least one of causing the imaging device to capture the image using an exposure value higher than the first exposure value and causing the imaging device to capture the image using an exposure value lower than the first exposure value; acquiring the image included in the monitoring video imaged under the set exposure condition; calculating a brightness distribution from the acquired image; setting the first exposure condition or setting the first exposure condition and the second exposure condition as the exposure condition for imaging, based on the brightness distribution of the image captured under the first exposure condition after the first exposure condition is set; and combining (i) a first image that is not detected in an image captured under one of the first and second exposure conditions yet is detected in an image captured under the other of the first and second exposure conditions and (ii) a second image that is detected in the image captured under the first exposure condition and is detected in the image captured under the second exposure condition with (iii) the image captured under the one of the first and second exposure conditions, a value of a peak of a brightness level of the second image in the image captured under the other of the first and second exposure conditions being closer to a median value of brightness levels under each of the exposure conditions than a value of a peak of a brightness level of the second image in the image captured under the one of the first and second exposure conditions.

* * * * *